(12) United States Patent
Fujiwara et al.

(10) Patent No.: US 9,325,933 B2
(45) Date of Patent: Apr. 26, 2016

(54) DATA TRANSMISSION APPARATUS, DATA RECEPTION APPARATUS, AND DATA TRANSMISSION AND RECEPTION SYSTEM

(75) Inventors: Kazunari Fujiwara, Osaka (JP); Yasushi Ayaki, Osaka (JP); Takuya Nishimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 2002 days.

(21) Appl. No.: 12/444,055

(22) PCT Filed: Oct. 5, 2007

(86) PCT No.: PCT/JP2007/069597
§ 371 (c)(1),
(2), (4) Date: Apr. 2, 2009

(87) PCT Pub. No.: WO2008/044647
PCT Pub. Date: Apr. 17, 2008

(65) Prior Publication Data
US 2010/0077488 A1    Mar. 25, 2010

(30) Foreign Application Priority Data

Oct. 6, 2006  (JP) ................................ 2006-275272
Oct. 6, 2006  (JP) ................................ 2006-275754

(51) Int. Cl.
*G06F 21/00*  (2013.01)
*H04N 5/913*  (2006.01)
(Continued)

(52) U.S. Cl.
CPC .............. *H04N 5/913* (2013.01); *G06F 21/10* (2013.01); *H04N 21/2541* (2013.01);
(Continued)

(58) Field of Classification Search
USPC ............................................ 705/50–79, 901
See application file for complete search history.

(56) References Cited

U.S. PATENT DOCUMENTS

2005/0226149 A1* 10/2005 Jacobson ................ H04L 43/00
                                                            370/229
2006/0004770 A1    1/2006 Nakano et al.
(Continued)

FOREIGN PATENT DOCUMENTS

| JP | 2006-18709 | 1/2006 |
|---|---|---|
| JP | 2006-80587 | 3/2006 |
| WO | 2005/020234 | 3/2005 |

OTHER PUBLICATIONS

International Search Report issued Jan. 22, 2008 in the International (PCT) Application of which the present application is the U.S. National Stage.
(Continued)

*Primary Examiner* — James A Reagan
(74) *Attorney, Agent, or Firm* — Wenderoth, Lind & Ponack, L.L.P.

(57) ABSTRACT

A data transmission and reception system and the like are provided, which are capable of preventing: unauthorized copying between a server and a client; and unnecessary use limit when a copyright constraint is conformed. A server generates and manages overall use permission information indicating that the overall data accumulated in the server can be used and distributes the overall use permission information together with copied data to the client determined to exist within a private use range. The client manages the overall use permission information and the data received from the server in such a manner associated with each other and enables use of the data received from the server only when the overall use permission information is valid. When the client moves only within the private use range, the server continuously manages the overall use permission information so as to enables use of the copied data. Meanwhile, use of the copied data in the client which has moved out of the private use range is inhibited.

7 Claims, 26 Drawing Sheets

(51) Int. Cl.
  *G06F 21/10* (2013.01)
  *H04N 21/254* (2011.01)
  *H04N 21/258* (2011.01)
  *H04N 21/4408* (2011.01)
  *H04N 21/45* (2011.01)
  *H04N 21/8355* (2011.01)

(52) U.S. Cl.
  CPC .. *H04N 21/25816* (2013.01); *H04N 21/25841* (2013.01); *H04N 21/4408* (2013.01); *H04N 21/4524* (2013.01); *H04N 21/8355* (2013.01); *H04L 2463/103* (2013.01); *H04N 2005/91321* (2013.01)

(56) References Cited

U.S. PATENT DOCUMENTS

2007/0009232 A1  1/2007  Muraki et al.
2008/0072046 A1* 3/2008  Ayaki ............... H04L 43/0864
                                                                  713/171

OTHER PUBLICATIONS

"Digital Transmission Content Protection Specification vol. 1 (Informational Version)", Revision 1.51, Oct. 1, 2007. The relevant passages: 4.5 Protocol Flow (p. 30).

"Digital Transmission Protection License Agreement", Adopter Agreement, Jun. 2007.

"DTCP vol. 1 Supplement E Mapping DTCP to IP (Informational Version)", Revision 1.2, Jun. 15, 2007. The relevant passages: V1SE.8.2 Internet Datagram Header Time to Live (TTL) Constraint p. 32) and V1SE.8.5 Additional Localization via RTT (pp. 38-41).

RFC2616 "Hypertext Transfer Protocol—HTTP/1.1", The Internet Society, 1999. The relevant passages: 4 HTTP Message (pp. 25-29); 5 Request (pp. 29-32); and 6 Response (pp. 32-34).

* cited by examiner

FIG. 12

| Overall-information-generation-apparatus information | Overall-use-permission-information identifier | Overall-use-permission-information confirmation interval [sec] | Data identifier |
|---|---|---|---|
| aaa.bbb.ccc.ddd | 1111 | 3600 | AAA |
| | | | BBB |
| | | | CCC |
| aaa.bbb.ccc.eee | 5555 | 4800 | DDD |
| | | | EEE |

DATA TRANSMISSION APPARATUS, DATA RECEPTION APPARATUS, AND DATA TRANSMISSION AND RECEPTION SYSTEM

TECHNICAL FIELD

The present invention relates to communication technologies used for transferring data between two apparatuses on a network, and in particular to a control technology or a management technology used for the transferring of copyrighted data, such as content including copyright constraint.

BACKGROUND ART

In recent years, owing to the development of broadband environments including xDigital Subscriber Lines (xDSL) and optical fibers, communications using the Internet have rapidly come into wide use from businesses to households. Further, home network environments have also become common, in which personal computers (PC) and home appliances in a household are connected via Ethernet (registered trademark), wireless LAN, or the like. Furthermore, in such communication environments, not only the PC but also home digital appliances such as a digital TV, a DVD recorder, a set top box (STB), and a portable player have become connectable to each other.

Along with implementation of communication and file transfer between digital home appliances and PCs or between PCs on the Internet or via the home network, a variety of applications have been proposed and being implemented. A data transmission and reception system 20 as shown in FIG. 1. will be taken up here as an example. A data transmission apparatus (a home sever) 200 in a home network 108 receives data from an external server (content server) 105 or a transmitter station 106 via a network 107 to distribute to another data reception apparatus (home digital appliance) 210 and the like in a home. Data received from the above described external server 105 and the like includes a variety of kinds, such as data for which a user pay to purchase and data obtained for free.

The data distributed by the data transmission apparatus 200 is received by the data reception apparatus (DVD recorder) 210, a data reception apparatus (portable player) 220, or a data reception apparatus (digital TV) 230 in the home network 180 to be used for the purpose of viewing, storage (backup or dubbing), and so on. In such use forms, a user can handle data arbitrarily without having to know where the data is stored.

When handling data that requires copyright protection, such as a new movie, paid TV program, and music, it is necessary to protect the copyright appropriately. Methods for protecting copyright include a method that encrypts data that requires copyright protection and restrict use of the data.

When copyright of content needs to be protected in transmitting the content by using a network, for example, the content is encrypted and then transmitted. As an example for such a case, Digital transmission content protection over Internet protocol (DTCP-IP) method is standardized (see Non-Patent References 1 to 4, for example).

The DTCP-IP method includes an authentication function and a key invalidation function and implements copyright protection when transmitting content, by excluding an illegal device and encrypting content that requires copyright protection, such as AV data, before transmission.

Further, since use of content that requires copyright protection is generally limited to personal use in a home, it is necessary to restrict distribution of content from an AV sever in a home to an unspecified reception apparatus outside the home without limitation.

In the TCP-IP method, a time to live (TTL) and a round trip time (RTT) are employed in order to limit a range which a command to be transmitted can reach. It is to be noted that the TTL represents a time to live for a packet in IPv4 and corresponds to the number of relays in IPv6. More specifically, the number of routers that an IP packet can go through can be designated by using a value set in a TTL filed included in an IP packet header. In the DTCP-IP, the TTL of the IP packet that transmits a command for exchanging an authentication key is set equal to or less than three.

Further, a command transaction for measuring the RTT is specified in authentication processing of the DTCP-IP, so that the RTT is determined by measuring the time taken for a transmission apparatus to transmit a command for measuring the RTT to a reception apparatus and receive a response from the reception apparatus and that a key exchange process is carried out only when the RTT is equal to or less than 7 ms.

Conventionally, a variety of techniques have been presented as transmission and reception systems provided with the above-described copyright protecting function (see Patent Reference 2, for example). An operation of a conventional transmission and reception system will be described with reference to FIG. 2 below.

FIG. 2 is a block diagram which shows a configuration of a conventional transmission and reception system. Here, a communication system is shown, which includes apparatuses in a home 2101 to 2104 and apparatuses outside the home 2105 to 2107 that are connected to the apparatuses in the home 2101 to 2104 via the Internet.

As shown in FIG. 2, an AV server 2101 that is the transmission apparatus to transmit content, a digital television 2102 that is the reception apparatus to receive and use the content, a portable player 2103, and a router 2104 are placed in the home. Here, the router 2104 is connected to the AV server 2101 and the digital television 2102 via Ethernet (registered trademark) and to the portable player 2103 via a wireless medium (IEEE802.11b).

Further, a router 2105 and a PC 2106 and a digital television 2107 which are reception apparatuses are placed outside the home. Here, the router 2105 is connected to the PC 2106 via Ethernet (registered trademark) and to the digital television 2107 via a wireless medium (IEEE802.11b).

It is to be noted that the DTCP-IP described above is implemented in the transmission apparatus and each of the reception apparatuses.

In the transmission and reception system configured as described above, when content in the AV server 2101 is transmitted to the digital television 2102, the RTT (T1) is measured in the process of exchanging an authentication key. Since the digital television 2102 is a device placed in the same home as the AV server 2101, the T1 is equal to or less than 7 ms, and thus the digital television 2102 can receive an exchange key and generate a decryption key of received data. Further, the value of the TTL does not change in this case, so that the transmission is not affected by the TTL constraint.

Even when trying to transmit the content in the AV server 2101 to the digital television 2107 placed in a different home, a command for exchanging an authentication key cannot be transmitted usually due to the TTL constraint. The TTL does not change when a virtual private network (VPN) is used, however, an RTT (T4) is measured in this case as well in the process of exchanging an authentication key, and thus the digital television 2107 cannot receive an exchange key and a decryption key of received data cannot be generated when the T4 exceeds 7 ms.

Conventionally, by confirming that constraint of the RTT and the TTL are satisfied before distributing content, the AV server 2101 in the home can distribute content to the digital television 2102 and the portable player 2103 in the same home and restrict distribution of content to the PC 2106 and the digital television 2107 which are reception apparatuses placed outside the home, as described above.

In such a transmission and reception system, however, since only whether or not content can be distributed is confirmed, when the reception apparatus in which distributed content is stored is taken outside the home, the use of the content which has been taken out can no longer be managed. For that reason, unauthorized content use may become possible by taking the reception apparatus to which content has been distributed in the home to the outside the home.

Therefore a technique to control use of distributed content outside the home is conventionally presented (see Patent Reference 1, for example.)

According to the technique of the Patent Reference 1, when using content distributed by an AV sever by accumulating on a reception apparatus such as a mobile device, a usage period is set to the content, and proximity confirmation using the RTT is periodically carried out on the content to which the usage period has been set to update the usage period. With this, in the case where the proximity confirmation using the RTT fails, the usage period cannot be updated, making it impossible to use the content. Therefore, it is possible to prevent misconduct to constantly use content by taking, to the outside the home, the reception apparatus in which the distributed content is accumulated.

Patent Reference 1: Japanese Unexamined Patent Application Publication No. 2006-18709
Patent Reference 2: Japanese Unexamined Patent Application Publication No. 2006-80587
Non Patent Reference 1: Digital Transmission Content Protection Specification Volume 1 (Informational Version)
Non Patent Reference 2: Digital Transmission Protection License Agreement
Non Patent Reference 3: DTCP Volume 1 Supplement E Mapping DTCP to IP (Informational Version)
Non Patent Reference 4: RFC2616 Hypertext Transfer Protocol—HTTP/1.1

DISCLOSURE OF INVENTION

Problems that Invention is to Solve

However, with the above-described conventional technique, a client that has received copy data accesses a server for determining availability of each copy data. Meanwhile, the server that accumulates original data determines that the copy data is available only when the original data matches the copy data. Thus, in the case where the server moves the original data to a different server in the same home, the client holding the copy data cannot determine the availability, and thus the copy data, which is supposed to be used without any problems, becomes unavailable, thereby causing a first problem that convenience for a user is impaired.

Further, there is a second problem with the transmission and reception system of the above-described Patent Reference 1 in that, although it is possible to restrict a period of using distributed content accumulated in a reception apparatus taken outside the home, the number of reception apparatuses which might be taken out, with the distributed content being accumulated, cannot be restricted.

Here, adding a control function for restricting the number of the reception apparatuses may be considered as a countermeasure. Even in that case, however, there is a third problem that use of content is restricted by the number restriction when a user replaces an existing reception apparatus with a newly purchased reception apparatus. In the case where a user who has a maximum number of reception apparatuses allowed by the number restriction replaces one of the reception apparatuses with a new reception apparatus, for example, content can be used only by the reception apparatus to be replaced or the reception apparatus employed for the replacement, thereby causing a problem that confirmation processing and the like for moving content cannot be performed sufficiently.

The present invention has been conceived in view of the above-described problems, and a first object of the present invention is to provide a data transmission and reception system and the like which prevent: unauthorized copying between a data transmission apparatus and a data reception apparatus; and an unnecessary use limit when the copyright constraint is conformed.

Further, a second object of the present invention is to provide a transmission apparatus, transmission and reception system, and the like which, in a transmission and reception system capable of restricting content use outside (or, away from) the home of a reception apparatus which accumulates distributed content, can control the number of reception apparatuses that might be taken out with the content being accumulated and avoid restricting content use even when the reception apparatus is replaced.

Means to Solve the Problems

In order to solve the above described conventional problems, the data transmission and reception system according to the present invention comprises a data transmission apparatus and a data reception apparatus, wherein the data transmission apparatus includes: a control information generation unit configured to generate use control information indicating that the copyrighted data is available within a predetermined use limit in the data transmission and reception system; a proximity confirmation unit configured to measure a round trip time taken for transmitting and receiving a predetermined measuring packet to and from the data reception apparatus; and a control information management unit configured to control transmission of the use control information and the copyrighted data to the data reception apparatus in the case where the measured round trip time is equal to or less than a predetermined time, and the data reception apparatus includes: a proximity confirmation unit configured to transmit and receive the predetermined measuring packet between the data reception apparatus and the data transmission apparatus; and a control information management unit configured to control reception of the use control information and the copyrighted data from the data transmission apparatus.

Further, the data transmission apparatus according to the present invention is a data transmission apparatus that transmits copyrighted data having a use limit based on a copyright, in a data transmission and reception system, the data transmission apparatus comprising: a use information generation unit configured to generate use control information indicating that the copyrighted data is available overall within a predetermined use limit in the data transmission and reception system; a proximity confirmation unit configured to measure a round trip time taken for transmitting and receiving a predetermined measuring packet to and from the data reception apparatus; and a use information management unit configured to control transmission of the use control information and the copyrighted data to the data reception apparatus in the case where the measured round trip time is equal to or less than a predetermined time.

Further, the data reception apparatus according to the present invention is a data reception apparatus that receives copyrighted data having a use limit based on a copyright from a data transmission apparatus, in a data transmission and reception system, the data reception apparatus comprising: a proximity confirmation unit configured to transmit and receive a predetermined measuring packet, to and from the data transmission apparatus; and a use information management unit configured to control reception of use control information and the copyrighted data from the data transmission apparatus.

With this, it is possible to prevent: unauthorized copying between the data transmission apparatus and the data reception apparatus; and an unnecessary use limit when a copyright constraint is conformed.

Further, the data transmission apparatus according to the present invention comprises: a use control information transmission unit configured to generate and transmit to the data reception apparatus, use control information that is information allowing use of the content in the data reception apparatus in the case where the round trip time is confirmed to be equal to or less than the predetermined time by the proximity confirmation unit; a registration management unit configured to register, on a registration list, identification information of the data reception apparatus to which the use control information is transmitted by the use control information transmission unit, and to delete the identification information from the registration list in the case where an instruction to delete the identification information registered on the registration list is obtained; and a deletion management unit configured to register, on a deletion list, the identification information deleted from the registration list, by the registration management unit, wherein the use control information transmission unit is further configured to transmit new use control information in the case where a request for new use control information is received from a data reception apparatus corresponding to identification information that is not registered on the registration list, on condition that the proximity confirmation unit confirms that the round trip time between the data transmission apparatus and the data reception apparatus is equal to or less than the predetermined time when a total number of identification information entries on the registration list and the deletion list is less than a predetermined maximum number.

With this, the data reception apparatus that has transmitted use control information is registered on the registration list and a data reception apparatus registered on either the registration list or the deletion list can use content, so that the number of reception apparatuses that might be taken out with the content being accumulated can be managed and use of content is not restricted even when the data reception apparatus is replaced.

Further, the use control information is transmitted to the data reception apparatus only when a round trip time between the data transmission apparatus and the data reception apparatus is confirmed to be within a predetermined amount of time, so that use of content in the data reception apparatus in which the distributed content is accumulated is restricted outside (or away from) the home.

It is to be noted that the "new use control information" is logically "new use control information" and includes not only use control information (physically different use control information) different from the use control information that the data reception apparatus received first, but also information (logical use control information) that updates (extends) an available period of the use control information that data reception apparatus received first.

Here, it is preferable that the registration list has a storage capacity of a predetermined number of identification information entries, and the use control information transmission unit, when receiving a request for the use control information from the data reception apparatus that is not registered on the registration list, is configured to determine whether or not the identification information entries on the registration list have reached the predetermined number and, when determining not having reached, to transmit the use control information to the data reception apparatus. With this, the number of the data reception apparatus that can be registered on the registration list is restricted to a fixed number determined by a storage capacity of the registration list.

Further, it is preferable that the deletion management unit is configured to delete the identification information of which a delay time that is a predetermined time has passed after registration, from among identification information entries on the deletion list. With this, use limit when the data reception apparatus is replaced can be avoided and a misconduct that content in a deleted data reception apparatus remains indefinitely used can be prevented.

Further, it is preferable that the registration list has a storage capacity of N identification information entries, and the deletion list has a storage capacity of equal to or more than N identification information entries. With this, the number of the data reception apparatus which can use content constantly is secured so as to be N and the number of the data reception apparatus including temporary use becomes equal to or more than 2N, so that in the case where all of N data reception apparatuses owned by a user are replaced with other N data reception apparatuses, for example, content in either one of the 2N data reception apparatuses can be used at least for a predetermined period. Therefore, it is possible to perform confirmation processing sufficiently for moving content and the like.

It is to be noted that the present invention can be implemented: as a data transmission method or a data reception method including the characteristic components of the aforementioned data transmission apparatus or the data reception apparatus, as steps; and as a program that causes a computer to execute such steps. It is obvious that such program can be widely distributed by recording media, such as a DVD, and via transmission media, such as the Internet. Furthermore, the present invention can be implemented as a data transmission and reception system including the data transmission apparatus and the data reception apparatus.

Effects of the Invention

With the data transmission and reception system and the like according to the present invention, data can be moved without restriction within a private use range on a home network, data accumulated in a data transmission apparatus (server) can be temporarily moved to a network HDD or a DVD recorder and a user can avoid unnecessary use limit.

Furthermore, with the data transmission apparatus and the data transmission and reception system and the like according to the present invention, it is possible to restrict: a period that the data reception apparatus accumulating distributed content is taken away out of a home and used; and the number of data reception apparatuses that might be taken out with the content being accumulated, and to avoid restricting content use when the reception apparatus is replaced by a user.

Therefore, a copyright of content such as video and audio data is appropriately protected and replacement of apparatuses for using content is facilitated, providing significantly high practical value especially in the present time in which home appliances network system that uses content with plural apparatuses in a home is widely used.

BRIEF DESCRIPTION OF DRAWINGS

FIG. 12 is a diagram which shows an example of a structure of a management table of overall use permission information according to the first embodiment.

Figure 1:
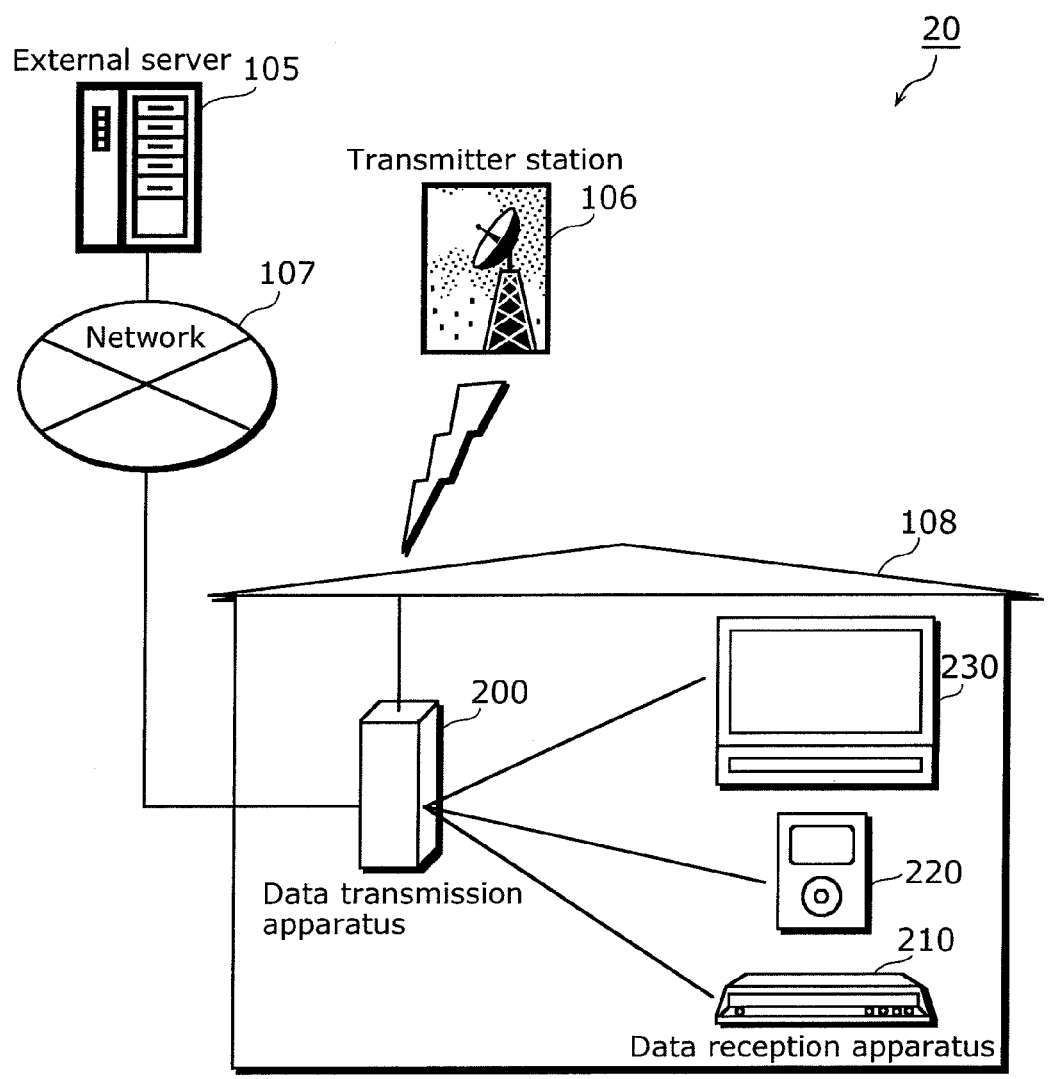
FIG. 1 is a diagram which shows an overview of data transmission and reception system.
Figure 2:
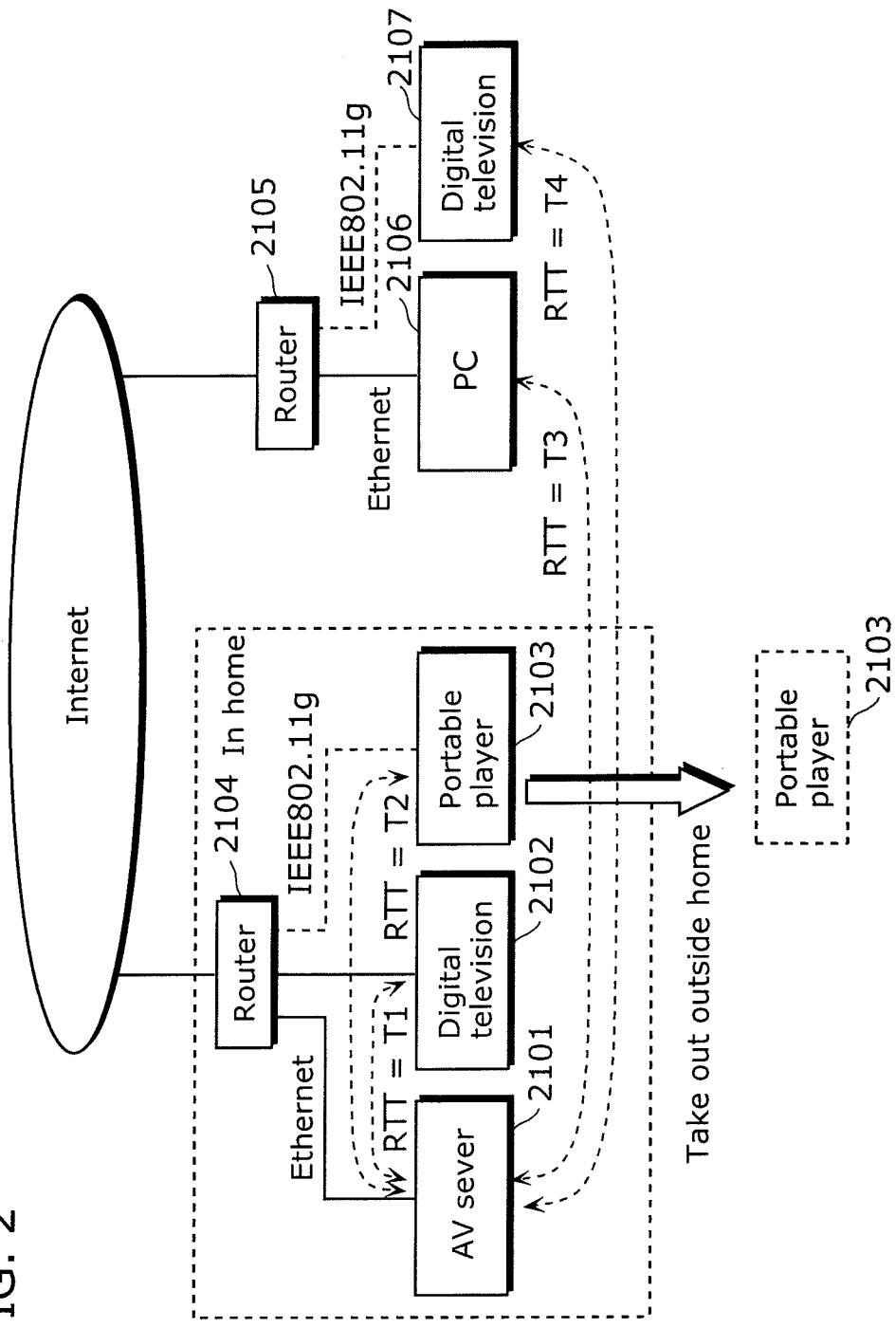
FIG. 2 is a diagram which shows a configuration of a conventional transmission and reception system.

NUMERICAL REFERENCES 10, 20: a data transmission and reception system
100, 101, 200: a data transmission apparatus
110, 120: a data reception apparatus
210, 220, 230: a data reception apparatus
105: an external server
106: a transmitter station
107: a network
108: a home network
1001, 1101: a communication unit
1002, 1102: an overall information management unit
1003: an overall information generation unit
1004, 1105: a data accumulation unit
1005, 110: a proximity confirmation unit
1006, 1008: an authentication unit
1007, 1109: a key management unit
1008, 1110: a control unit
1106: a confirmation interval control unit
2001, 2101: an AV sever
2002, 2102: a digital television
2003, 2103: a portable player
2004, 2005: a router
2104, 2105: a router
2006, 2106: a PC
2007, 2107: a digital television
2010: a reception apparatus
2021: a transmission and reception unit 2022: an encryption processing unit
2023: a key exchange processing unit
2024: an authentication processing unit
2025: an RTT measurement processing unit
2026: an HDD
2027: a registration management unit
2027a: a registration device list
2028: a registration and deletion inputting unit
2029: a deletion management unit
2029a: a deletion device list
2030: a use-control-key transmission control unit
2031: a transmission and reception unit
2032: a decryption processing unit
2033: a key exchange processing unit
2034: an authentication processing unit
2035: an RU measurement processing unit
2036: an HDD
2037: a content use management unit

BEST MODE FOR CARRYING OUT THE INVENTION

Embodiments according to the present invention will be described below with reference to the drawings. It is to be noted that although the present invention will be described using the following embodiments and the attached drawings, the object is to exemplify the present invention, not intending to limit the present invention to these embodiments and drawings.

(First Embodiment)

Figure 3:
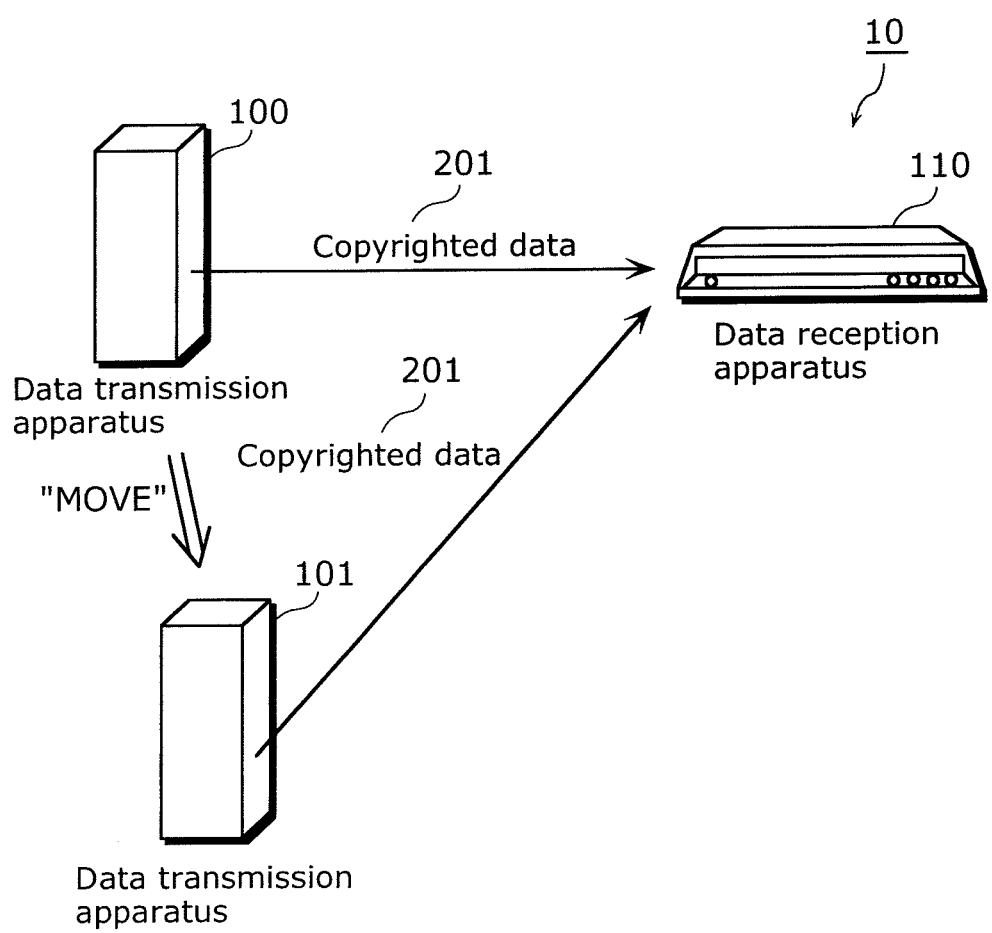
FIG. 3 is a diagram which shows a configuration of a part of the data transmission and reception system according to an embodiment of the present invention.

FIG. 3 is a diagram which shows a configuration of a part of a data transmission and reception system 10 according to the present embodiment, and shows transmitting and receiving copyrighted data 201 between a data transmission apparatus 100 and a data reception apparatus 110 in the case where original data is "moved" from the data transmission apparatus 100 to the data transmission apparatus 101. In the present embodiment as shown in FIG. 3, performing authentication using "overall use permission information" enables transmitting and receiving the copyrighted data 201 between the data transmission apparatus 100 and the data reception apparatus 110 after the "move" of the original data, which has conventionally been impossible. It is to be noted that the overall use permission information is an example of use control information according to CLAIMS.

It is to be noted that the data transmission and reception system 10 according to the present invention includes the data transmission apparatus 100 (and further, the data transmission apparatus 101) as substitute for the data transmission apparatus 200 in the data transmission and reception system 20 of the above-described conventional technique, and the data reception apparatuses 110 to 130 (not shown) as substitute for the data reception apparatuses 210 to 230. It is to be noted that the data transmission apparatus 100 and the data transmission apparatus 101 are apparatuses that have the equivalent function and are, for example, home severs having "authentication function in a challenge and response method" in conformity with the DTCP-IP.

Figure 4:
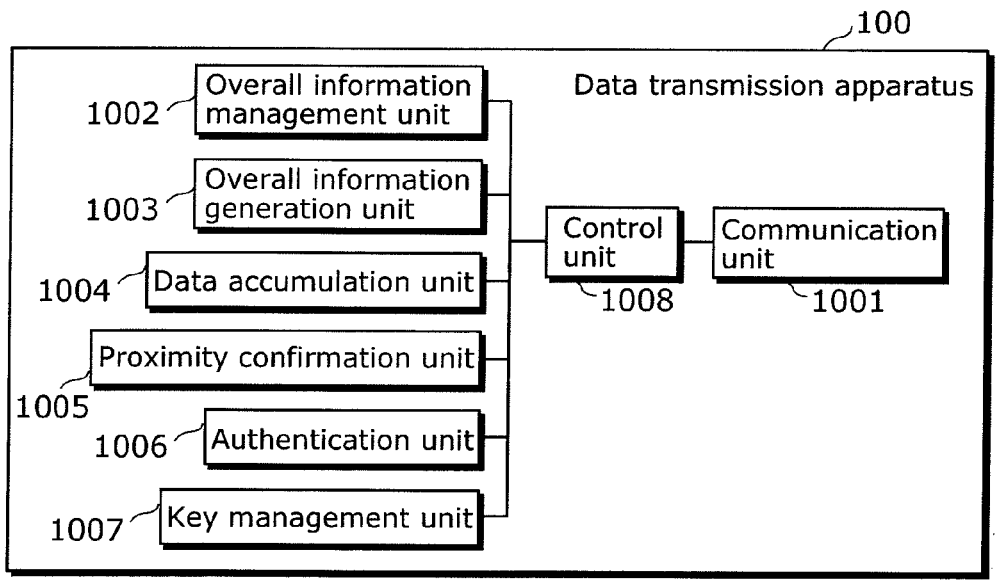
FIG. 4 is a block diagram which shows a functional structure of the data transmission apparatus according to an embodiment of the present invention.

FIG. 4 is a block diagram which shows a functional configuration of the data transmission apparatus 100 according to the present embodiment. The data transmission apparatus 100 includes: a communication unit 1001; an overall information management unit 1002; an overall information generation unit 1003; a data accumulation unit 1004; a proximity confirmation unit 1005; an authentication unit 1006; a key management unit 1007; and a control unit 1008.

The communication unit 1001 communicates with an external server 105 and the data reception apparatus 110 on the network 107 to transmit and receive copyrighted data 201. Further, the communication unit 1001 obtains, where necessary, an encryption key from the key management unit 1007, performs encryption processing on the copyrighted data 201 to be transmitted, and performs decryption processing on the copyrighted data 201 to be received.

The control unit 1008 is a microcomputer provided with a ROM, a RAM, and the like which store a control program and controls an operation of each unit of the data transmission apparatus 100. The overall information management unit 1002 manages a management table of overall use permission information 600 that includes overall use permission information 500 generated by the overall information generation unit 1003. Copyrighted data 201 managed by the overall information management unit 1002 will be described later. Further, the overall use permission information 500 is transmitted to the data reception apparatus in the case where a result of measurement by the proximity confirmation unit 1005 is equal to or less than a predetermined amount of time. Further, in response to a request for confirming the overall use permission information, it is notified that the overall use permission information 500 is valid in the case where the result of measurement by the proximity confirmation unit 1005 is equal to or less than the predetermined amount of time.

The overall information generation unit 1003 generates the overall use permission information 500 when the copyrighted data 201 is received from the external server 105. The overall use permission information 500 includes: the overall-use-permission-information identifier 501 and the overall-use-permission-information confirmation interval 502. For the overall-use-permission-information identifier 501, generation methods which use random numbers or a device ID of the DTCP-IP of the data transmission apparatus or the data reception apparatus may be employed. Excepting the case where only one overall-use-permission-information identifier 501 is generated, the overall-use-permission-information identifier 501 to be generated is preferably generated as a value not overlapping at least in the same data transmission apparatus in such cases where plural pieces of overall use permission information 500 are generated and used separately for each data reception terminal. It is to be noted that the overall-use-permission-information confirmation interval according to the present embodiment is an example of use-control-information confirmation interval according to CLAIMS.

The data accumulation unit 1004 accumulates the copyrighted data 201 received from the external server and the copyrighted data 201 received from the other data transmission apparatus, and a hard disk drive (HDD) may be considered as the data accumulation unit 1004, for example.

The proximity confirmation unit 1005 performs a proximity confirmation using an RTT between the data reception apparatus 110 and the like. As to a method for measuring the RTT between the data transmission apparatus 100 and the data reception apparatus 110 and the like, the technique disclosed by the Patent Reference 2 may be used for the measurement, for example. Further, the proximity confirmation is regarded as a success in the case where a result of the measurement of RTT is equal to or less than the predetermined amount of time, and the data reception apparatus is recorded on a proximity authentication completion table (RTT registry). The proximity confirmation using the RTT is described by the Non-Patent Reference 3 in detail as described above.

The authentication unit 1006 performs authentication processing using the challenge and response method between the data transmission apparatus 100 and the data reception apparatus 110 and the like, and generates an authentication key for encrypting an exchange key. The authentication processing is described by the Non-Patent Reference 3 in detail as described above.

The key management unit 1007 generates and stores an exchange key and an encryption key of the copyrighted data 201. A method of generating the exchange key and the encryption key of the copyrighted data 201 is not described in detail in the present application, but is described by the aforementioned Non-Patent Reference 3 in detail.

It is to be noted that the overall information generation unit of the data transmission apparatus according to the present embodiment is an example of a use information generation unit according to CLAIMS. Similarly, the overall information management unit is an example of a use information management unit according to CLAIMS, the confirmation interval control unit is an example of a confirmation interval control unit according to CLAIMS, and the proximity confirmation unit is an example of a proximity confirmation unit according to CLAIMS.

Figure 5:
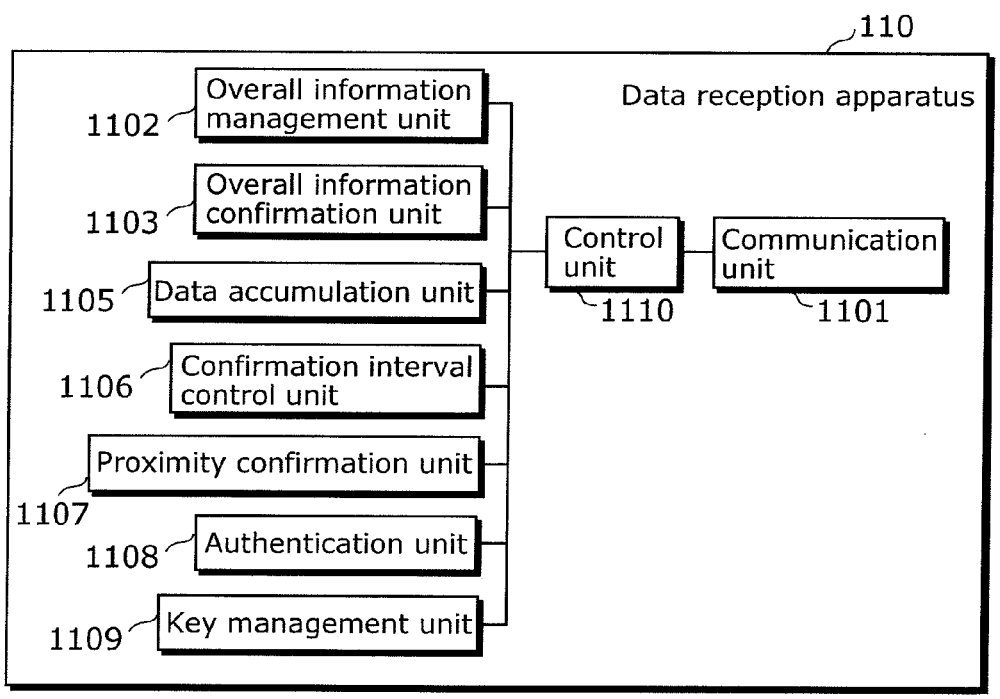
FIG. 5 is a block diagram which shows a functional configuration of the data reception apparatus according to an embodiment of the present invention.

FIG. 5 is a block diagram which shows a functional configuration of the data reception apparatus 110 according to the present embodiment. The data reception apparatus 110 includes: a communication unit 1101; an overall information management unit 1102; an overall information confirmation unit 1103; a data accumulation unit 1105; a confirmation interval control unit 1106; a proximity confirmation unit 1107; an authentication unit 1108; a key management unit 1109; and a control unit 1110.

The communication unit 1101 communicates with the data transmission apparatus 110 and transmits and receives the copyrighted data 201. Further, the communication unit 1101 obtains, where necessary, an encryption key from the key management unit 1109, performs encryption processing on the copyrighted data 201 to be transmitted, and performs decryption processing on the copyrighted data 201 to be received.

The control unit 1110 is a microcomputer provided with a ROM, a RAM, and the like which store a control program and controls an operation of each unit of the data reception apparatus 110. The overall information management unit 1102 manages a management table of overall use permission information 600 including the overall use permission information 500 received from the data transmission apparatus 100. Copyrighted data 201 managed by the overall information management unit 1102 will be described later.

The overall information confirmation unit 1103, according to an instruction from the confirmation interval control unit 1106 that will be described later, confirms the overall use permission information 500 between the data transmission apparatus 100 that manages the overall use permission information 500 by using the overall-use-permission-information identifier 501 managed by the overall information management unit 1102. When confirming the overall use permission information 500, authentication processing and proximity confirmation using the RTT are performed. In the case where both of the authentication processing and the proximity confirmation succeed, a request for updating the confirmation interval is sent to the confirmation interval control unit 1106 that will be described later. In the case where either processing fails, whether or not the confirmation interval has been exceeded is confirmed to the confirmation interval control unit 1106. In the case where the confirmation interval has been exceeded, the overall use permission information 500 managed by the overall information management unit 1102 is discarded and the copyrighted data 201 accumulated in the data accumulation unit 1105 that will be described later is invalidated. The overall information confirmation unit 1103 confirms once again the overall use permission information of the overall information management unit 1102. In the case where overall use permission information 500 is newly obtained, the copyrighted data 201 that has been once invalidated may be validated.

The data accumulation unit 1105 accumulates the copyrighted data 201 received from the data transmission apparatus, and a hard disk drive (HDD) may be considered as the data accumulation unit 1005, for example The confirmation interval control unit 1106 measures a confirmation interval based on the overall-use-permission-information confirmation interval 502 included in the overall use permission information 500. The confirmation interval control unit 1106 issues an instruction to the overall information confirmation unit 1103 to confirm the overall use permission information 500 when the confirmation interval has been exceeded. It is to be noted that the confirmation interval control unit 1106 may issue the instruction to confirm the overall use permission information 500 before the confirmation interval is exceeded. This makes it possible to perform retry processing within the confirmation interval even in the case where the confirmation processing of the overall use permission information 500 fails.

The proximity confirmation unit 1107 performs a proximity confirmation using an RTT between the data transmission apparatus 100. The proximity confirmation unit 1107 responses to an RTT test request from the data transmission apparatus 100, thereby enabling time measurement of the RTT in the data transmission apparatus 100. The proximity confirmation using the RTT is described by the Non-Patent Reference 3 in detail as described above.

The authentication unit 1108 performs authentication processing through a "challenge and response method" between the data transmission apparatus 100 and generates an authentication key for encrypting an exchange key. The authentication processing is described by the Non-Patent Reference 3 in detail as described above.

The key management unit 1109 manages the exchange key received from the data transmission apparatus and the encryption key of the copyrighted data 201. A method of receiving the exchange key and a method of generating the encryption key of the copyrighted data 201 are not described in detail in the present application, but are described by the aforementioned Non-Patent Reference 3 in detail.

It is to be noted that the overall information management unit of the data reception apparatus according to the present embodiment is an example of a use information management unit, the data accumulation unit is an example of a data accumulate unit according to the CLAIMS, the confirmation interval control unit is an example of a confirmation interval control unit according to the CLAIMS, and the proximity confirmation unit is an example of a proximity confirmation unit according to the CLAIMS.

Figure 6:
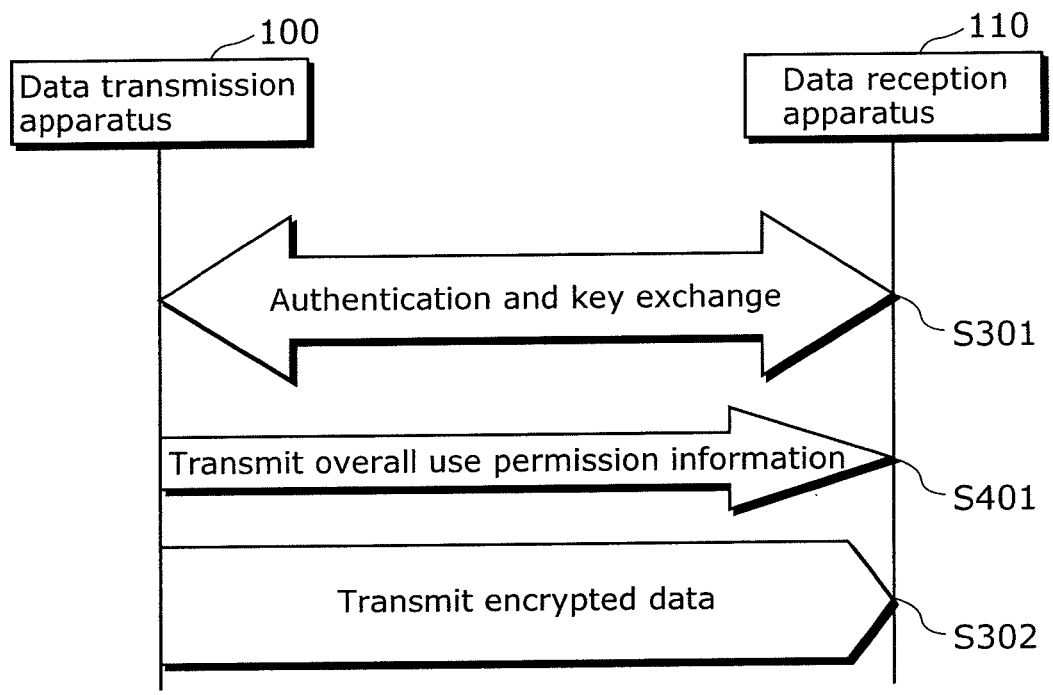
FIG. 6 is a diagram which shows an overview of a communication sequence when transmitting copyrighted data according to a first embodiment.

FIG. 6 is a diagram which shows an overview of a communication sequence when transmitting the copyrighted data 201 according to the first embodiment. According to the conventional DTCP-IP, encrypted data is transmitted (S302) after performing authentication and key exchange (S301). The present embodiment is different from the conventional DTCP-IP in that the overall use permission information 500 is further transmitted separately from the encrypted data (S401). Here, the "overall use permission information" is information that indicates giving overall permission for using the copyrighted data 210 accumulated by the data transmission apparatus 100, which is generated by the data transmission apparatus 100 and transmitted to the data reception apparatus 110 and the like. The data reception apparatus 110 holds the overall use permission information 500 in association with the copyrighted data 201 that has been received from the data transmission apparatus 100, and the data associated with the overall use permission information 500 can be used only when the overall use permission information 500 is held.

Figure 7:
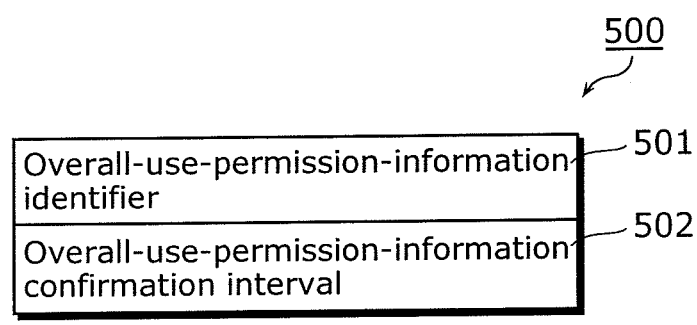
FIG. 7 is a diagram which shows an example of a structure of overall use permission information according to the first embodiment.

FIG. 7 is a diagram which shows an example of the structure of the overall use permission information 500 according to the present embodiment. The overall use permission information 500 includes: the overall-use-permission-information identifier 501 and the overall-use-permission-information confirmation interval 502.

The overall-use-permission-information identifier 501 is an identifier provided for identifying the overall use permission information 500 which is the data received by the data reception apparatus 110 from the data transmission apparatus 100, and provided by the data transmission apparatus 100 that has generated the overall use permission information 500. As to the overall-use-permission-information identifier 501, identifiers different for each of the data reception apparatuses 110 may be distributed by preparing plural pieces of data, or a common identifier may be distributed to all of the data reception apparatuses 100 by preparing a single value. Although a method for generating the overall-use-permission-information identifier 501 will not be described in detail in the present application, a generation method using random numbers and a generation method using a device ID of the DTCP-IP provided for each data reception apparatus 110 may be considered.

The overall-use-permission-information confirmation interval 502 is a value that indicates a time interval when the data reception apparatus 110 performs confirmation processing on the data transmission apparatus 100 to determine whether or not the overall use permission information 500 is valid. A method of confirming the overall use permission information 500 will be described later in detail.

The data reception apparatus 110 performs the confirmation processing for the overall use permission information 500 on the data transmission apparatus 100 and discards the overall use permission information 500 in the case where the confirmation fails while invalidating the copyrighted data 201 associated with the overall use permission information 500.

It is to be noted that the data reception apparatus 110 may perform the confirmation of the overall use permission information 500 at an interval shorter than the overall-use-permission-information confirmation interval 502. As described above, it is not necessary to discard immediately the overall use permission information 500 in the case where confirmation of the overall use permission information 500 fails before the overall-use-permission-information confirmation interval 502 is exceeded. The overall use permission information 500 can be continuously used when confirmation of the overall use permission information 500 is carried out again within the overall-use-permission-information confirmation interval 502 and the confirmation succeeds.

Figure 8:
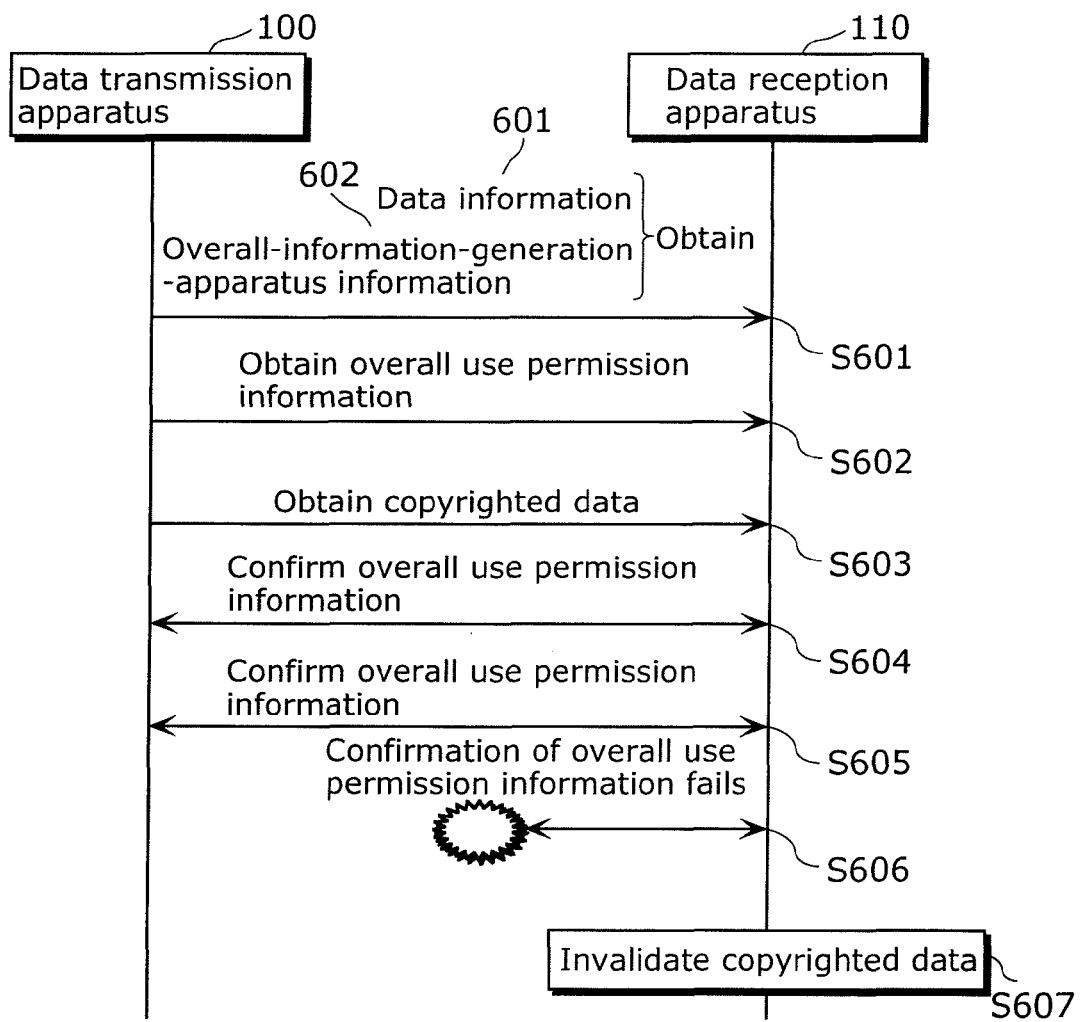
FIG. 8 is a diagram which shows an example of a communication sequence between the data transmission apparatus and the data reception apparatus 110 according to the first embodiment.

FIG. 8 is a diagram which shows an example of a communication sequence between the data transmission apparatus 100 and the data reception apparatus 110 according to the present embodiment.

First, the data reception apparatus 110 obtains, from the data transmission apparatus 100, data information 601 and information on the data transmission apparatus that generated the overall use permission information 500 (hereinafter referred to as "overall-information-generation-apparatus information 602") (S601). The "data information" is information that includes information which can identify the copyrighted data 201 accumulated by the data transmission apparatus 100 and accompanying information. More specifically, "uniform resource locator (URL)" of the data reception apparatus 210 and "data name" of the copyrighted data 201 are included (it is to be noted that the data information 601 is not limited to these examples). When transmitting a request for obtaining the copyrighted data 201 to the data transmission apparatus 100, the data reception apparatus 110 specifies the URL.

Further, the aforementioned overall-information-generation-apparatus information 602 is information that identifies the data transmission apparatus that generated the overall use permission information for the copyrighted data 201, and more specifically, may include "IP address" or "domain name" of the data transmission apparatus 100.

In the case where the data transmission apparatus that transmits the data information 601 and the data transmission apparatus that generated the overall use permission information regarding the copyrighted data 201 are the same, address information of the data transmission apparatus that transmitted the data information 601 is specified on the overall-information-generation-apparatus information 602. In the case where the data transmission apparatus that transmits the data information 601 and the data transmission apparatus that generated the overall use permission information of the copyrighted data 201 are different, address information of a data transmission apparatus different from the data transmission apparatus that received the data information 601 is specified on the overall-information-generation-apparatus information 602. A sequence in the case where the copyrighted data 201 and the overall use permission information 500 is managed separately by different apparatuses will be described later. The data reception apparatus 110 obtains the overall use permission information 500 based on the overall-information-generation-apparatus information 602.

Next, the data reception apparatus 110 obtains the overall use permission information 500 from the data transmission apparatus 100 by using the overall-information-generation-apparatus information 602 (S602). The overall use permission information 500 includes the overall-use-permission-information confirmation interval 502. Next, the data reception apparatus 110 obtains the copyrighted data 201 from the data transmission apparatus 100 by specifying the URL of the copyrighted data 201 included in the data information 601 (S603). After receiving the copyrighted data 201, the data reception apparatus 110 stores, in the data accumulation unit 110, the copyrighted data 201 and the overall use permission information 500 in associated with each other.

Next, the data reception apparatus 110 performs periodically, on the data transmission apparatus 100 that generated the overall-use-permission-information 500, confirmation of the overall use permission information 500 according to the overall-use-permission-information confirmation interval 502 (S604 and S605). In the case where the confirmation of the overall use permission information 500 fails (S606), the data reception apparatus 110 discards the overall use permission information 500 and invalidates the copyrighted data 201 associated with the overall use permission information 500, when the time indicated in the overall-use-permission-information confirmation interval 502 has been exceeded after the immediately preceding confirmation of the overall use permission information 500 (S607). It is to be noted that the copyrighted data 201 that has been invalidated may be revalidate when the data reception apparatus 110 obtains the overall use permission information again from the data transmission apparatus 100 that generated the overall use permission information 500.

Figure 9:
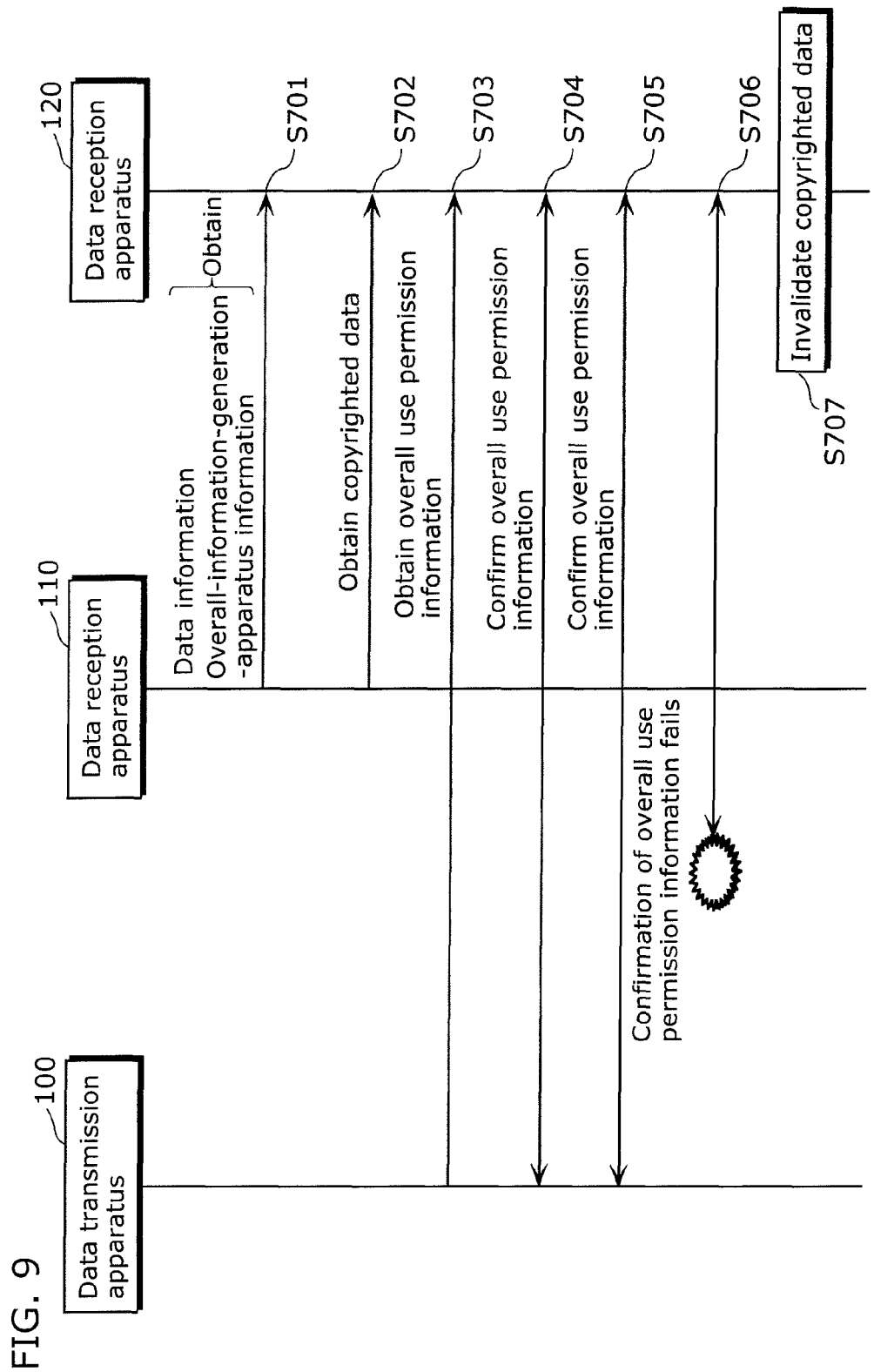
FIG. 9 is a diagram which shows an example of a communication sequence in the case where the data transmission apparatus that received copyrighted data is a different apparatus from the data transmission apparatus that generated overall use permission information on the copyrighted data, according to a first embodiment.

FIG. 9 is a diagram which shows an overview of a communication sequence between the data transmission apparatus 101 that generated the overall use permission information 500, the data reception apparatus 110 that accumulates the copyrighted data 201, and the data reception apparatus 110 that receives the copyrighted data 201 in the case where the data transmission apparatus 100 that received copyrighted data 201 is a different apparatus from the data transmission apparatus 101 that generated the overall use permission information 500 regarding the copyrighted data 201. The case shown by FIG. 9 corresponds to the case where the data reception apparatus 120 receives the copyrighted data 201 from the data reception apparatus 110 after the copyrighted data 201 originally accumulated in the data transmission apparatus 100 is moved to the data reception apparatus 110, for example.

Similarly to the case of FIG. 8 as described above, the data reception apparatus 120 first obtains data information 601 and overall-information-generation-apparatus information 602 from the data reception apparatus 110 that manages the copyrighted data 201 (S701).

Next, the data reception apparatus 120 analyzes the obtained overall-information-generation-apparatus information and, when the apparatus described in the overall-information-generation-apparatus information 602 is different from the data transmission apparatus 100, obtains only the copyrighted data 201 from the data reception apparatus 110 (S702).

Further, the data reception apparatus 120 obtains the overall use permission information 500 from the data transmission apparatus 100 that generated the overall use permission information 500 associated with the copyrighted data 201 by using the overall-information-generation-apparatus information 602 (S703). The overall use permission information 500 includes the overall-use-permission-information confirmation interval 502.

The data reception apparatus 120 performs periodically, on the data transmission apparatus 100 that generated the overall-use-permission-information 500, confirmation of the overall use permission information 500 according to the overall-use-permission-information confirmation interval 502 (S704 and S705).

In the case where the confirmation of the overall use permission information 500 fails (S706), the data reception apparatus 120 discards the overall use permission information 500 and invalidates the copyrighted data 201 associated with the overall use permission information 500 when the time indicated in the overall-use-permission-information confirmation interval 502 has passed after the immediately preceding confirmation of the overall use permission information 500 (S707). It is to be noted that the copyrighted data 201 that has been invalidated may be revalidate when the data reception apparatus 120 obtains the overall use permission information again from the data transmission apparatus 100 that generated the overall use permission information 500.

The communication sequence described in FIG. 8 will be explained in detail below. In the present embodiment, a communication in conformity with the DTCP-IP is assumed, and an example of the communication sequence will be described.

Figure 10:
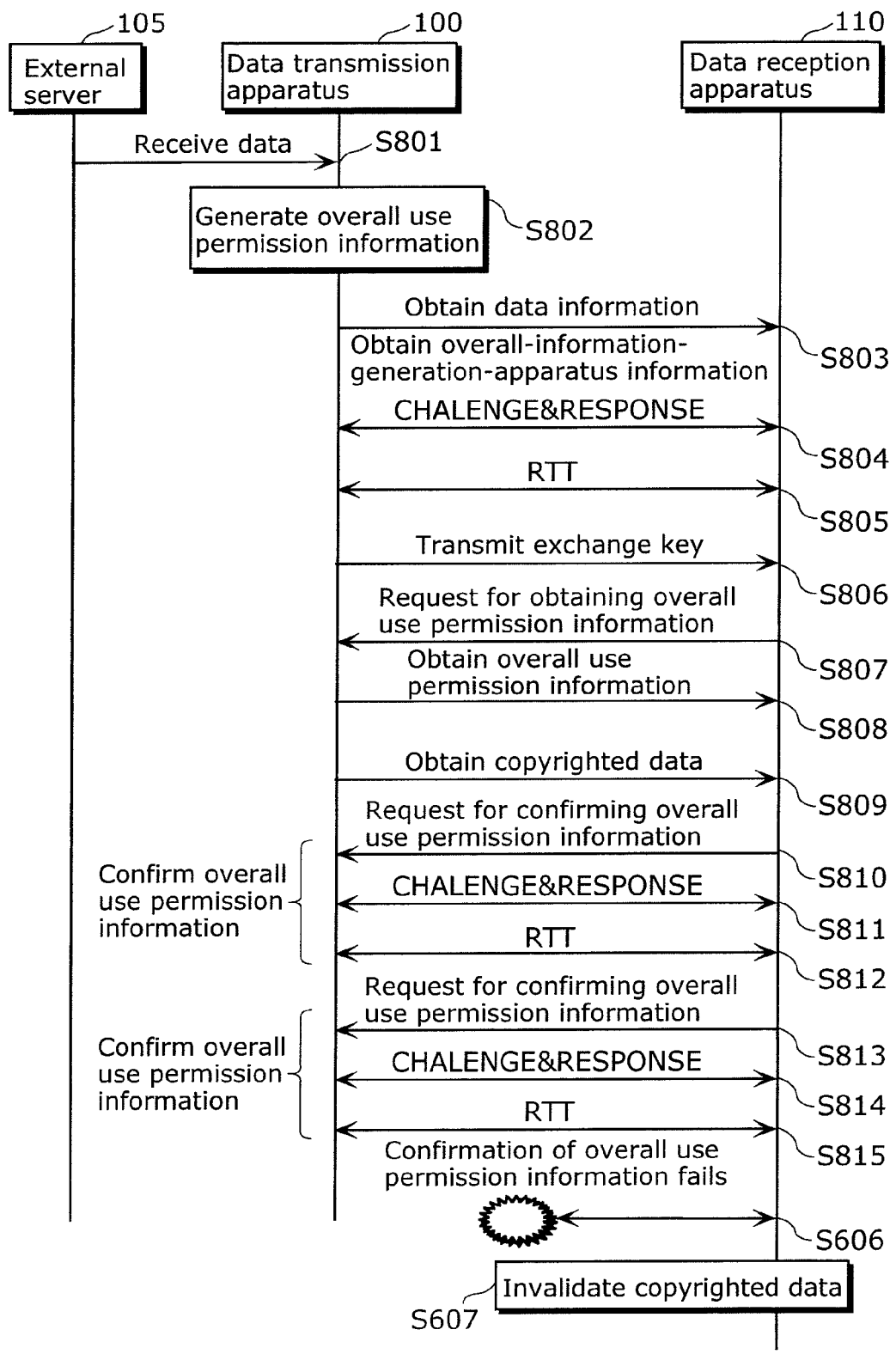
FIG. 10 is a communication sequence diagram in the case where the DTCP-IP is applied in the communication sequence of FIG. 8 described above.

FIG. 10 is a communication sequence diagram in the case where the DTCP-IP is applied in the communication sequence of FIG. 8 described above.

First, the data transmission apparatus 100 obtains the copyrighted data 201 from the external server 105 located on the network 107 (S801). In this case, the copyrighted data 201 is data, such as paid content, on which a use limit based on copyright is imposed. It is to be noted that a detailed explanation as to a procedure performed before obtaining the copyrighted data 201, such as a procedure for purchasing data, will be omitted because they are not directly relevant to the present invention.

Next, the data transmission apparatus 100 generates the overall use permission information 500 (S802). The overall use permission information 500 generated by the data transmission apparatus 100 will be describe later. In the case where the overall use permission information 500 has already been generated, the data transmission apparatus 100 does not have to generate new overall use permission information 500.

The data reception apparatus 110 obtains data information 601, from the data transmission apparatus 100, triggered by an instruction from a user, and the like (S803). As to the data information 601, an obtaining method which uses Universal Plug and Play (UPnP) and the like may be considered, but is not limited to this. The data information 601 is not limited to a singe piece of information, but includes plural pieces of data information 601 in the case where the data transmission apparatus 100 accumulates plural pieces of copyrighted data 201. Further, the data information 601 includes information regarding the DTCP-IP and information of the data transmission apparatus that generated the overall use permission information 500 associated with the copyrighted data 201. Since the data transmission apparatus 100 that accumulates the copyrighted data 201 generates the overall use permission information 500 in the case of FIG. 10, the apparatus specified by the overall-information-generation-apparatus information 602 and the data transmission apparatus 100 that accumulates the copyrighted data 201 are the same.

Next, the data reception apparatus 110 performs authentication processing and authentication key sharing processing between the data transmission apparatus 100 through a challenge and response method of the DTCP-IP by using information included in the obtained data information 601 (S804). The authentication key is used for encrypting an exchange key which will be described later, and the like. The authentication processing will not be described in detail in the present application, but described by the Non-Patent Reference 3 in detail. The processing will be ended in the case where the authentication processing fails.

When the authentication processing succeeds, the data transmission apparatus 100 performs proximity confirmation on the data reception apparatus 110 by measuring the RTT (Round Trip Time) (S805). Here, "proximity confirmation" refers to confirmation to determine whether or not the amount of time taken for a predetermined packet (measuring packet) to be transmitted from a source to a destination and then come back to the source is within a specified time (7 msec, for example). It is to be noted that the processing to confirm proximity by measuring the RTT is referred to as "RTT processing".

The details of the RTT processing will not be described in detail in the present application, but are described in detail in the Non-Patent Reference 3. In the case where the RTT processing fails, the communication is ended. By performing the proximity confirmation using the RTT and transmitting the encryption key of the copyrighted data 201 only when the proximity confirmation succeeds, it is possible to prevent an unauthorized copy of the copyrighted data 201 from flowing outside a predetermined range (outside a home, for example).

When the RTT processing succeeds, the data transmission apparatus 100 transmits the exchange key to the data reception apparatus 110 (S806). The exchange key is encrypted by the authentication key and then transmitted. The details of transmission processing of the exchange key will not be described in detail, but are described in detail in the Non-Patent Reference 3. The exchange key is information necessary for generating the encryption key that actually encrypts or decrypts the copyrighted data 201.

The data reception apparatus 110 transmits a request for obtaining overall use permission information to the data transmission apparatus 100 after receiving the exchange key (S807). It is to be noted that the data reception apparatus 110 does not have to obtain new overall use permission information in the case where the overall use permission information 500 has already been received from the data transmission apparatus 100.

The data transmission apparatus 100, when receiving the request for obtaining overall use permission information from the data reception apparatus 110, determines whether or not the proximity confirmation has already been performed, and transmits the overall use permission information 500 in the case where the confirmation has been performed (S808). The overall use permission information 500 includes the overall-use-permission-information confirmation interval 502 that determines whether or not the overall use permission information 500 is valid. Further, the proximity confirmation is performed between the data reception apparatus 110 in the case where the proximity confirmation has not been performed, and the details will be described later. The data reception apparatus 110 starts measurement of a confirmation interval based on the overall-use-permission-information confirmation interval 502 after obtaining the overall use permission information 500.

After obtaining the overall use permission information 500, the data reception apparatus 110 obtains, and stores in the data accumulation unit 105, the encrypted copyrighted data 201 from the data transmission apparatus 100 (S809). The details of method of encrypting and decrypting the copyrighted data 201 will not be described in detail, but are described in detail in the Non-Patent Reference 3.

The data reception apparatus 110 transmits a request for confirming overall use permission information to the data transmission apparatus 100 when an amount of time that is indicated in the overall-use-permission-information confirmation interval 502 has passed (S810).

The data reception apparatus 110 performs authentication processing between the data transmission apparatus 100 after transmitting the request for confirming overall use permission information (S811). The authentication processing is the same as the aforementioned S804, and thus the description will be omitted. As described above, by performing the authentication processing when confirming the overall use permission information as well, it is possible to prevent performing the confirmation processing between an unauthorized data transmission apparatus. In the case where the authentication processing fails, the communication is ended.

The data transmission apparatus 100 performs the proximity confirmation between the data reception apparatus 110 by measuring the RTT after completing the authentication (S812). The RTT processing is the same as the aforementioned S805, and thus the description will be omitted. By performing the RTT processing when confirming the overall use permission information as well, it is possible to prevent the copyrighted data 201 from being taken out beyond a specified range without authorization. In the case where the proximity confirmation fails, the communication is ended.

The data reception apparatus 110 newly starts a measurement of the overall-use-permission-information confirmation interval 502 when the authentication and the proximity confirmation succeeds.

The data reception apparatus 110 periodically performs the RTT processing based on the confirmation interval (S813 to S815).

Next, the communication sequence described in FIG. 9 will be explained in detail. A communication realized by using the DTCP-IP is assumed in the present embodiment.

Figure 11:
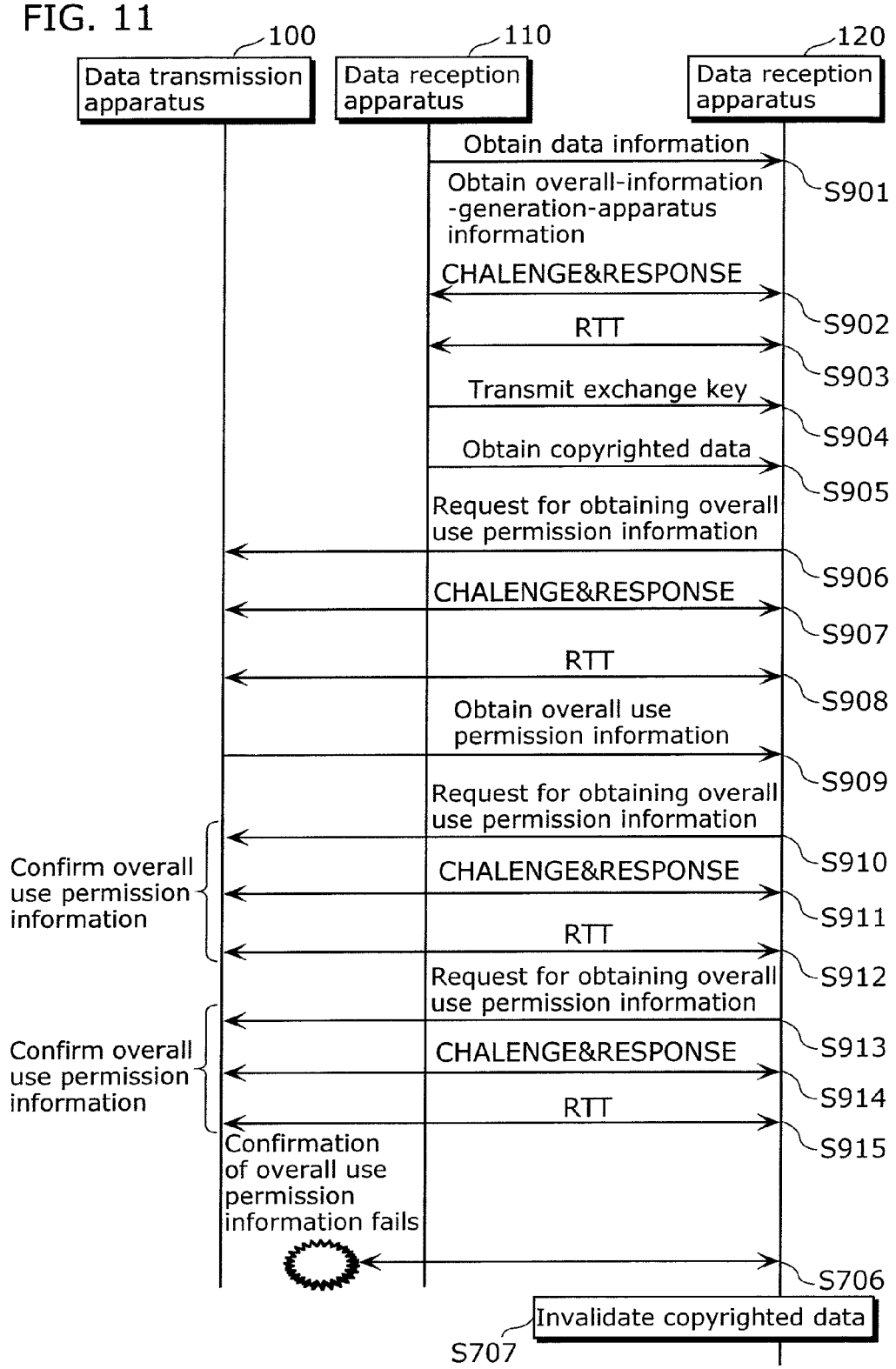
FIG. 11 is a diagram which shows a communication sequence in the case where the DTCP-IP is applied in a communication sequence between the data transmission apparatus, the data reception apparatus, and the data reception apparatus.

FIG. 11 is a diagram which shows a communication sequence according to the DTCP-IP between the data transmission apparatus 100, the data reception apparatus 110, and the data reception apparatus 120.

Step S901 is the same as Step S803 in aforementioned FIG. 10 except that information on the data transmission apparatus 100 included in the overall-information-generation-apparatus information 602 and the data information 601 is different.

Since the same processing as in Steps S804 to S806 of aforementioned FIG. 10 is performed in Steps S902 to S904, the description will be omitted. Further, the same processing as in aforementioned Step S809 is performed in Step S905, the description will be omitted.

The data reception apparatus 120 analyzes the overall-information-generation-apparatus information 602 and transmits a request for obtaining overall use permission information to the data transmission apparatus 100 (S906). The overall use permission information is obtained by the data transmission apparatus 100 which is different from the data reception apparatus 110 which has obtained the copyrighted data 201.

The data reception apparatus 120 performs authentication processing between the data transmission apparatus 100 after transmitting the request for confirming overall use permission information (S907). The authentication processing is the same as the aforementioned Step S804, and thus the description will be omitted. In the case where the authentication processing fails, the communication is ended.

The data transmission apparatus 100 performs the proximity confirmation by measuring the RTT between the data reception apparatus 101 (S908). The RTT processing is the same as the aforementioned Step S805, and thus the description will be omitted. In the case where the proximity confirmation fails, the communication is ended.

In the case of aforementioned FIG. 10, since the apparatus that obtains the overall use permission information 500 (the data transmission apparatus 100) and the apparatus that obtains the copyrighted data 201 (the data transmission apparatus 100) are the same, it is sufficient to perform the authentication and the RTT processing only once. In the case of FIG. 11, however, since the apparatus that obtains the overall use permission information 500 (the data transmission apparatus 100) and the apparatus that obtains the copyrighted data 201 (the data reception apparatus 110) are different, it is more secure to perform the authentication and the RTT processing on each of the apparatuses.

The data transmission apparatus 100 transmits the overall use permission information 500 to the data reception apparatus 120 in the case where the RTT processing succeeds (S909). The data reception apparatus 110 starts measurement of a confirmation interval based on the overall-use-permission-information confirmation interval 502 after obtaining the overall use permission information 500.

The data reception apparatus 110 transmits a request for confirming overall use permission information to the data transmission apparatus 100 when the overall-use-permission-information confirmation interval 502 has been exceeded (S910). This request for confirming overall use permission information is transmitted not to the data reception apparatus 110 that obtains the copyrighted data 201 but to the data transmission apparatus 110 that obtains the overall use permission information 500.

Steps S911 to S912 are the same as the aforementioned Steps S811 to S812, and thus the descriptions will be omitted.

The data reception apparatus 110 periodically confirms the overall use permission information based on the overall-use-permission-information confirmation interval 502 (S913 to S915).

Next, a management table of overall use permission information to be stored in an overall information management unit 1002 and an overall information management unit 1102 will be described.

FIG. 12 is a diagram which shows an example of a structure of the management table of overall use permission information 600. It is to be noted that the overall-information-generation-apparatus information 602, the overall-use-permission-information identifier 501 and the overall-use-permission-information confirmation interval 502 have been described earlier, and thus detailed description will not be presented here.

A data identifier 603 is an identifier capable of identifying the copyrighted data 201 accumulated in the data accumulation unit 1004 or the data accumulation unit 1105, and a path name of a directory in which the copyrighted data 201 is accumulated may be used, for example. It is to be noted that the data identifier 603 is not limited to the path name of the directory, but any identifiers that can identify the copyrighted data 201 may be used. The data information 601 is generated based on the data identifier 603. Alternatively, the data identifier 603 may be the URL regarding data included in the data information 601.

The overall information management unit 1002 assigns "aaa.bbb.ccc.ddd" as the overall-information-generation-apparatus information 602 in the case where the data identifier 603 transmits the data information 601 regarding the copyrighted data 201 of A, and assigns "aaa.bbb.ccc.eee" as the overall-information-generation-apparatus information 602 in the case where the data identifier 603 transmits the data information 601 regarding the copyrighted data 201 of D. Further, in the case where an identifier of the data transmission apparatus 100 that manages the management table of overall use permission information 600 is "aaa.bbb.ccc.ddd", the overall information management unit 1002 transmits "1111" as the overall-use-permission-information identifier 501 in response to the request for obtaining overall use permission information from the data reception apparatus 110 and transmits "3600" as the overall-use-permission-information confirmation interval 502.

The overall information management unit 1102, in the case where the data identifier 603 receives the data information 601 regarding the data of A from the data transmission apparatus, registers "AAA" as the data identifier 603 and "aaa.bbb.ccc.ddd" as the overall-information-generation-apparatus information 602 on the management table of overall use permission information 600 when receiving the data information 601. Further, overall information management unit 1102, in the case of obtaining the overall use permission information 500 regarding the data, obtains the overall use permission information 500 from the data transmission apparatus 100 associated with the "aaa.bbb.ccc.ddd" and registers "1111" as the overall-use-permission-information identifier 501 and "3600" as the overall-use-permission-information confirmation interval 502. The confirmation interval control unit 1106 performs confirmation processing of the overall use permission information 500 on the data transmission apparatus 100 associated with the "aaa.bbb.ccc.ddd" at an interval based on the "3600", and the overall information confirmation unit 1103 deletes the overall-use-permission-information identifier 501 "1111" and the overall-use-permission-information confirmation interval 502 "3600" in the management table of overall use permission information 600 in the case where the confirmation of the overall use permission information 500 does not succeed even when the confirmation interval has been exceeded.

Next, detailed processing of the data transmission apparatus 100 will be described. FIGS. 13 to 21 are flowcharts which show detailed operations of the data transmission apparatus 100.

Figure 13:
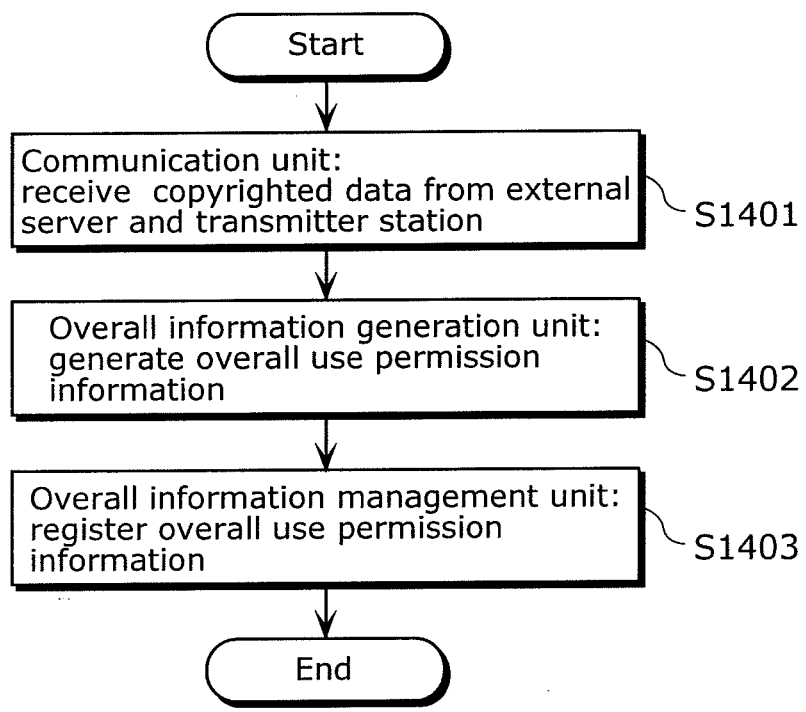
FIG. 13 is a flowchart which shows operations of the data transmission apparatus when receiving data from an external server according to the first embodiment.

FIG. 13 is a flowchart which shows operations of the data transmission apparatus 100 when receiving the copyrighted data 201 from the external server 105.

First, the communication unit 1001 obtains the copyrighted data 201 from the external server 105 or the transmitter station 106 (S1401). The processing of receiving the copyrighted data 201 includes authentication on the external server 105 and the transmitter station 106 or purchasing the copyrighted data 201 by a user. It is assumed that address information necessary for accessing the external server 105 and the like is set in advance by the user.

When the data transmission apparatus 100 receives copyrighted data from the external server 105 or the transmitter station 106, the overall information generation unit 103 generates information of "overall-information-generation-apparatus information 602", "the overall-use-permission-information identifier 501", "the overall-use-permission-information confirmation interval 502", and "data identifier 603" (S1402). In the case of this, address information of the data transmission apparatus 100 is used as the overall-information-generation-apparatus information 602. The overall-use-permission-information confirmation interval 502 may be received from the external server 105 or the transmitter station 106 or set a predetermined value as a fixed value.

Next, the overall information management unit 1002 adds information generated by the overall information generation unit 1003 to the management table of overall use permission information 600 (S1403).

Figure 14:
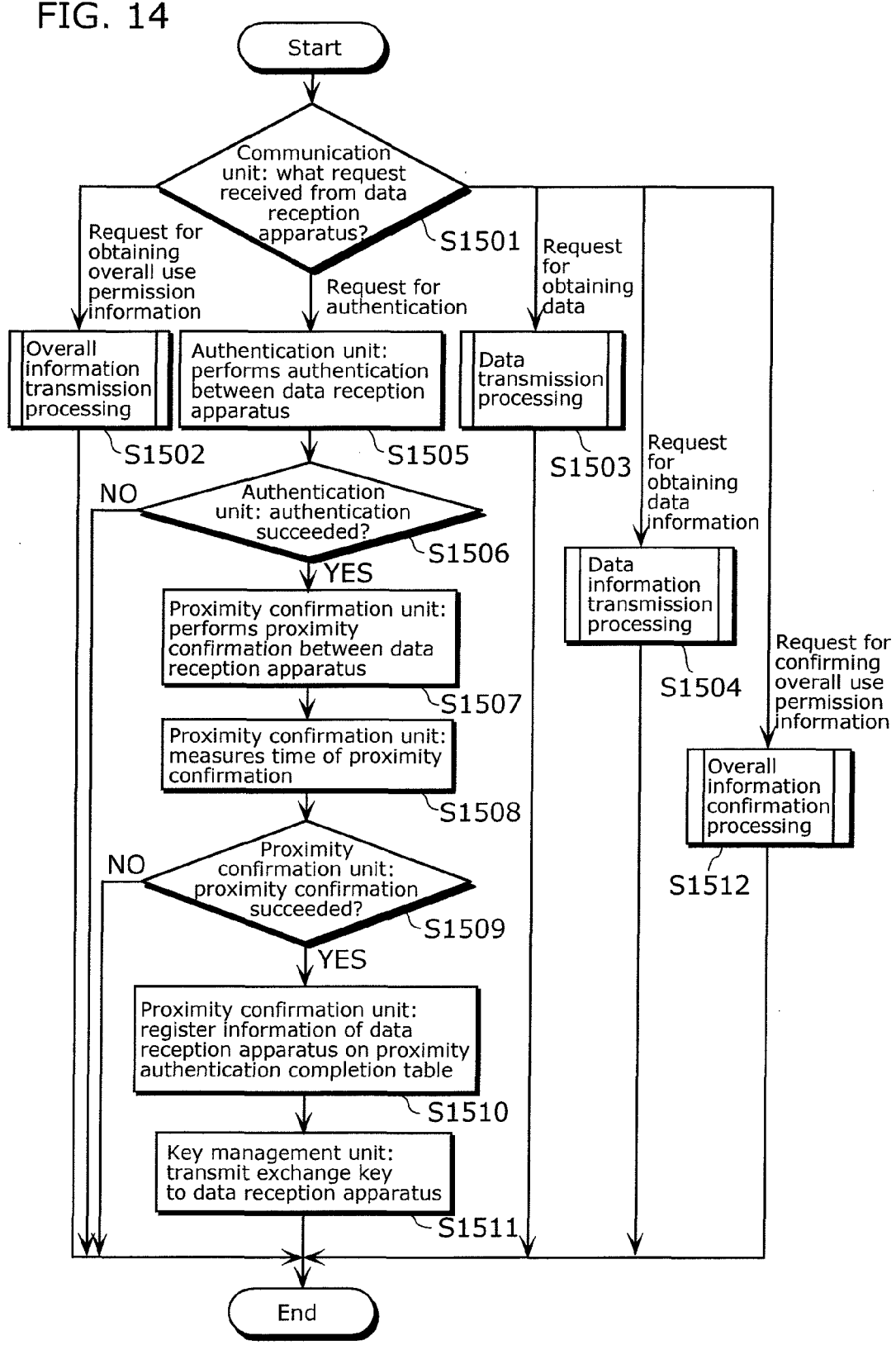
FIG. 14 is a flowchart which shows operations of the data transmission apparatus when receiving a request from the data reception apparatus according to the first embodiment.

FIG. 14 is a flowchart which shows a operational flow of the data transmission apparatus 100 when receiving various requests from the data reception apparatus 110.

First, the communication unit 1001 analyzes a request received from the data reception apparatus 110 (S1501). In the case where the request received from the data reception apparatus 110 is an authentication request, the authentication unit 1006 performs authentication between the data reception apparatus 110. When the authentication fails, the communication is ended (S1506).

On the other hand, when the authentication succeeds, the proximity confirmation unit 1005 starts proximity confirmation using the RTT between the data reception apparatus 110 (S1507) and measures the RTT (S1508). When the proximity confirmation using the RTT does not complete within a predetermined time and fails, the communication is ended (S1509). When the proximity confirmation using the RTT succeeds, the proximity confirmation unit 1005 registers information of the data reception apparatus 110 on an RTT registry (S1510). The RTT registry is described in detail in the Non-Patent Reference 3. When the proximity confirmation using the RTT succeeds, the key management unit 1007 transmits the exchange key to the data reception apparatus 110 (S1511). The methods of generating and transmitting the exchange key are described in detail in the Non-Patent Reference 3 as described above.

In the case where the request received from the data reception apparatus 110 is the request for obtaining overall use permission information, overall information transmission processing is performed (S1502).

Further, in the case where the request received from the data reception apparatus 110 is the data obtainment request, data transmission processing is performed (S1503).

Further, in the case where the request received from the data reception apparatus 110 is the data information obtainment request, data information transmission processing is performed (S1504).

Further, in the case where the request received from the data reception apparatus 110 is the request for confirming overall use permission information, confirmation processing of overall use permission information is performed (S1512).

Figure 15:
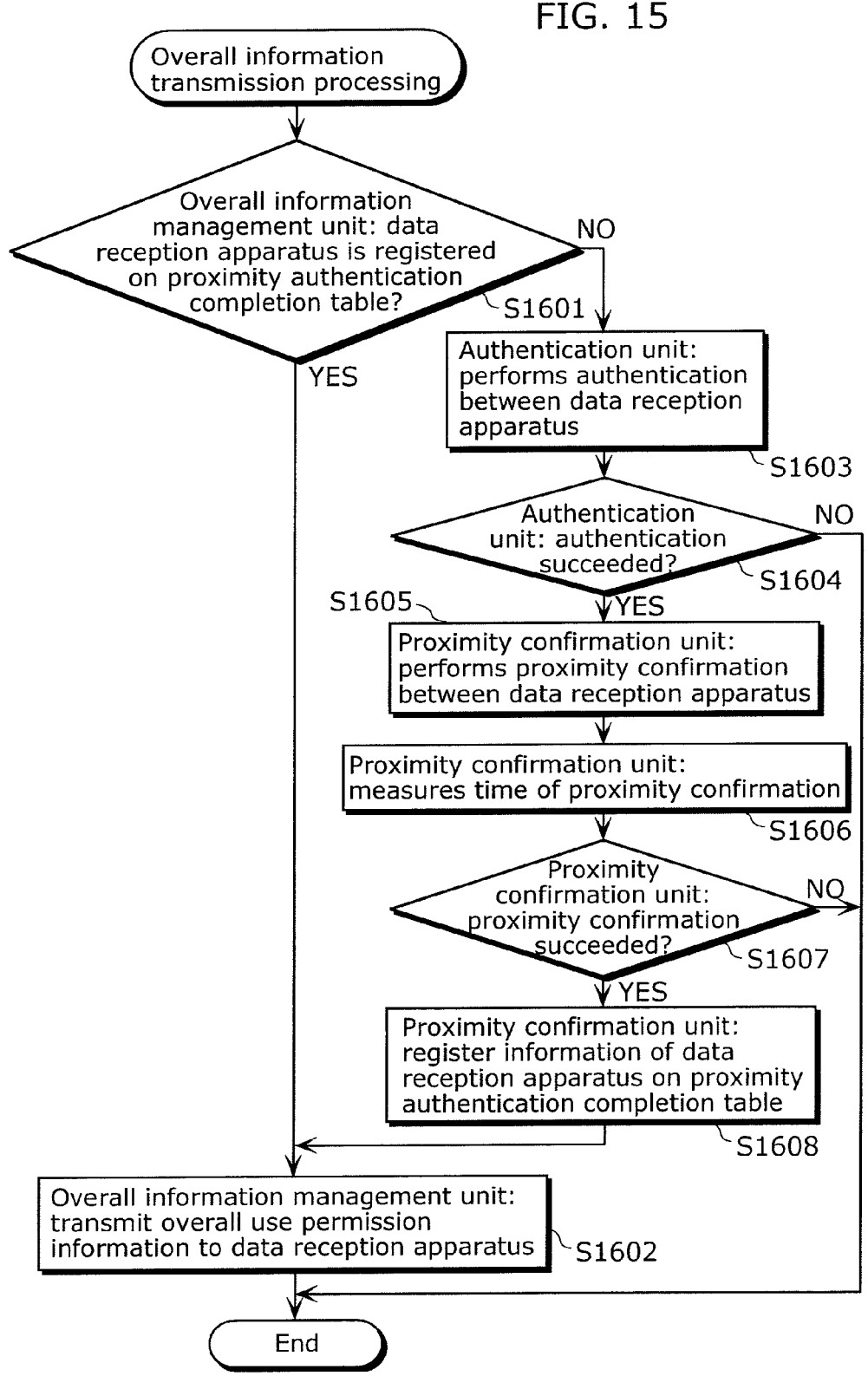
FIG. 15 is a flowchart which shows operations of the data transmission apparatus when performing transmission processing of overall information according to the first embodiment.

FIG. 15 is a flowchart which describes in detail the overall information transmission processing performed by the data transmission apparatus 100 of FIG. 14. The overall information management unit 1002 confirms whether or not the data reception apparatus 110 is registered on the RTT registry of the proximity confirmation unit 1005 (S1601). In the case where the data reception apparatus 110 has been registered, the overall use permission information 500 including "the overall-use-permission-information identifier 501" and "the overall-use-permission-information confirmation interval 502" is transmitted to the data reception apparatus 110 (S1602). A security further increases by encrypting the overall use permission information 500 using the authentication key or the exchange key before transmission. In the case where the data reception apparatus 110 is not registered, processing of Steps S1603 to S1608 is performed, which is the same processing as that of Steps S1506 to S1510 as described above, and thus detailed description will be omitted.

Figure 16:
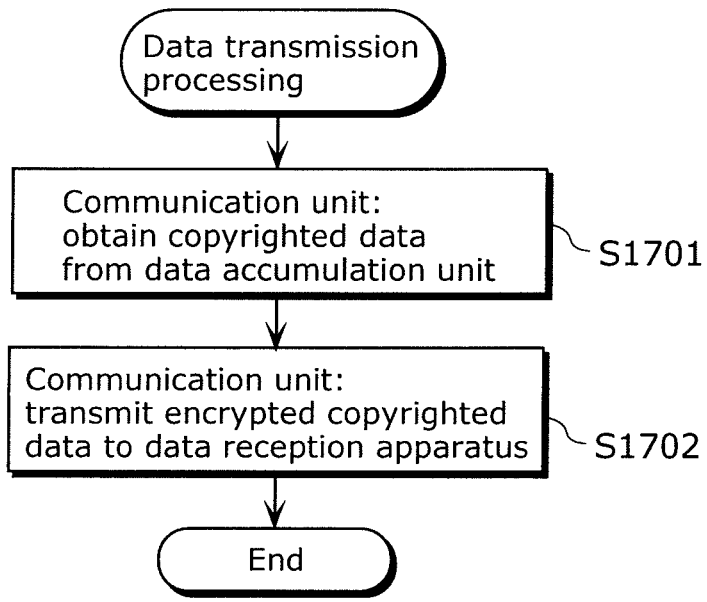
FIG. 16 is a flowchart which shows operations of the data transmission apparatus when performing data transmission processing according to the first embodiment.

FIG. 16 is a flowchart which describes in detail the data transmission processing performed by the data transmission apparatus 100 of aforementioned FIG. 14.

The communication unit 1001 obtains, from the data accumulation unit 1004, the copyrighted data 201 requested from the data reception apparatus 110 (S1701). Since an URL of data which is generated from the "data identifier 603" is added to the data obtainment request from the data reception apparatus 110, the communication unit 1001 can identify which copyrighted data 201 should be obtained from the data accumulation unit 1004. The information to be added to the data obtainment request is not limited to an URL generated from the "data identifier 603", but includes any information that can identify the copyrighted data 201.

The communication unit 1001 encrypts the copyrighted data 201 obtained from the data accumulation unit 1004 using the encryption key generated based on the exchange key managed by the key management unit 1007 and then transmits the encrypted copyrighted data 201 (S1702). A description regarding a method of encrypting the copyrighted data 201 will not be presented, but the method is described in detail by the Non-Patent Reference 3.

Figure 17:
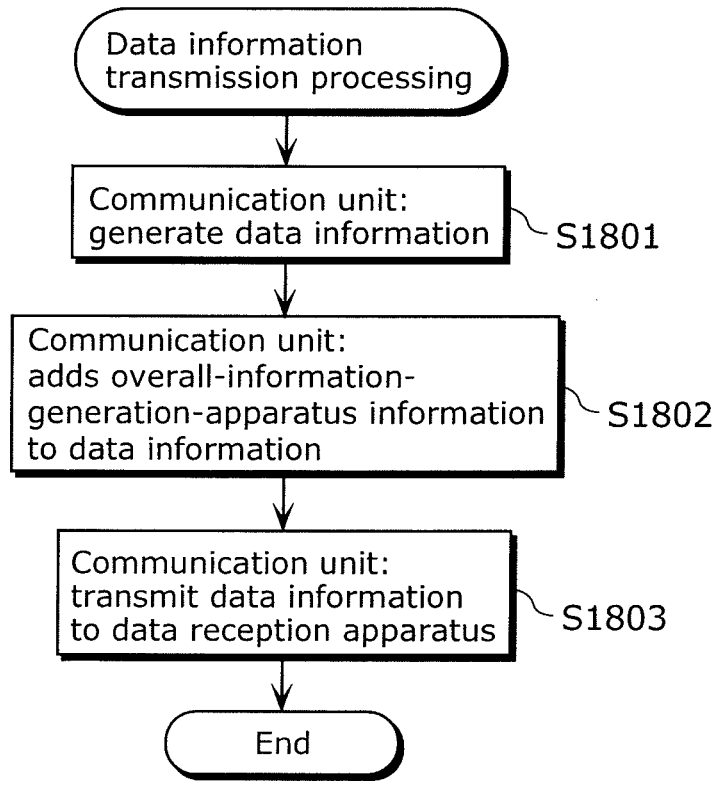
FIG. 17 is a flowchart which shows operations of the data transmission apparatus when performing data information transmission processing according to the first embodiment.

FIG. 17 is a flowchart which describes in detail the data information transmission processing performed by the data transmission apparatus 100 of aforementioned FIG. 14.

The communication unit 1001 generates the data information 601 including the "data identifier 603" that can identify the copyrighted data 201 (S1801). The data information 601 may include other information, such as "data name". The data information 601 is not limited to the above information, but may include any information regarding the copyrighted data 201.

Next, the communication unit 1001 further obtains the "overall-information-generation-apparatus information 602" related to the copyrighted data 201 from the overall information management unit 1002 and adds to the data information 601 (S1802).

After generating the data information 601, the communication unit 1001 transmits the data information 601 to the data reception apparatus 110 (S1803).

Figure 18:
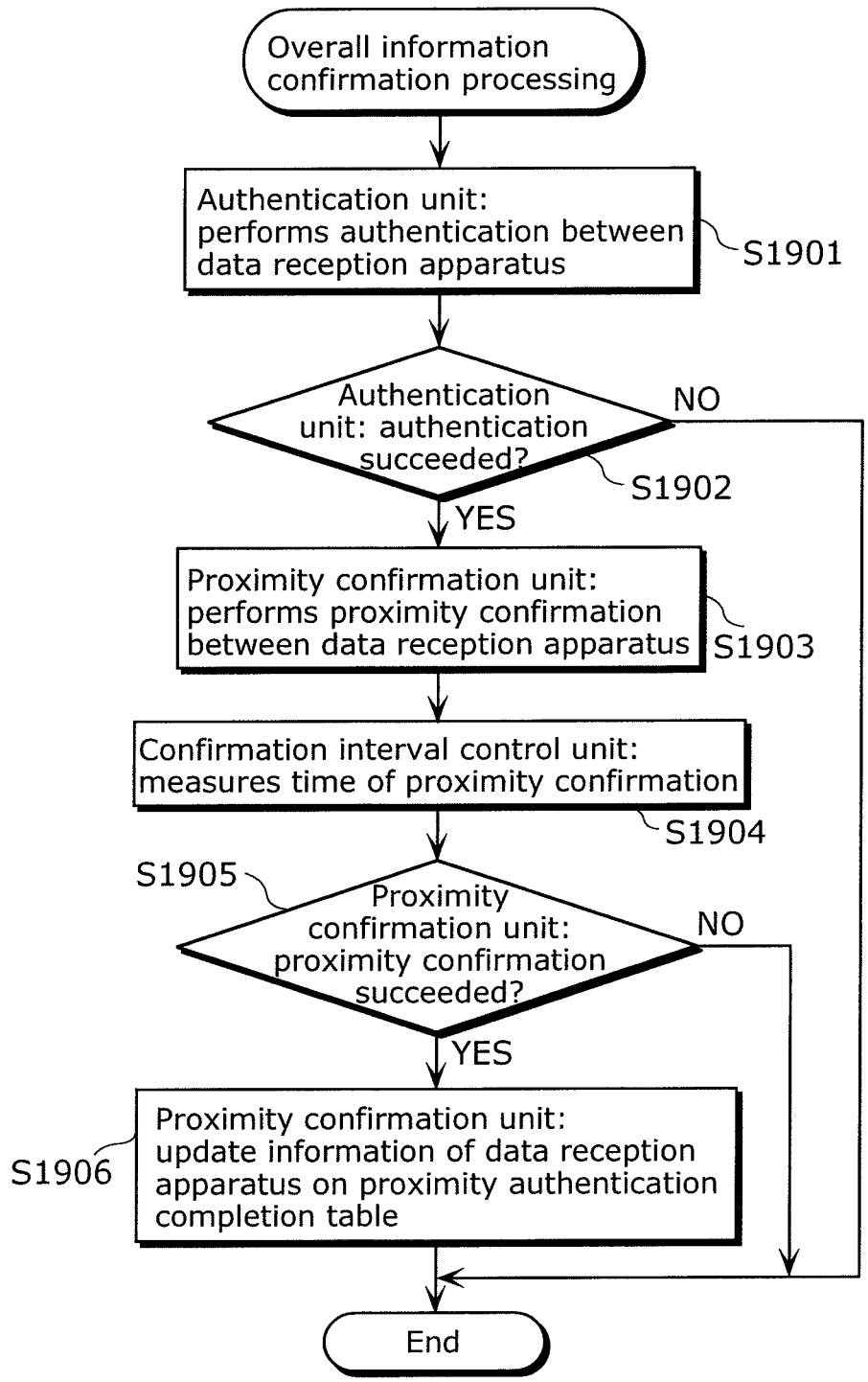
FIG. 18 is a flowchart which shows operations of the data transmission apparatus when performing confirmation processing of overall information according to the first embodiment.

FIG. 18 is a flowchart which describes in detail the confirmation processing of overall information performed by the data transmission apparatus 100 of aforementioned FIG. 14.

Processing of Steps S1901 to S1906 which is performed in the confirmation processing of overall information is the same processing as that of Steps S1506 to S1510 as described above, and thus detailed description will be omitted.

Next, processing performed by the data reception apparatus 110 will be described in detail.

Figure 19:
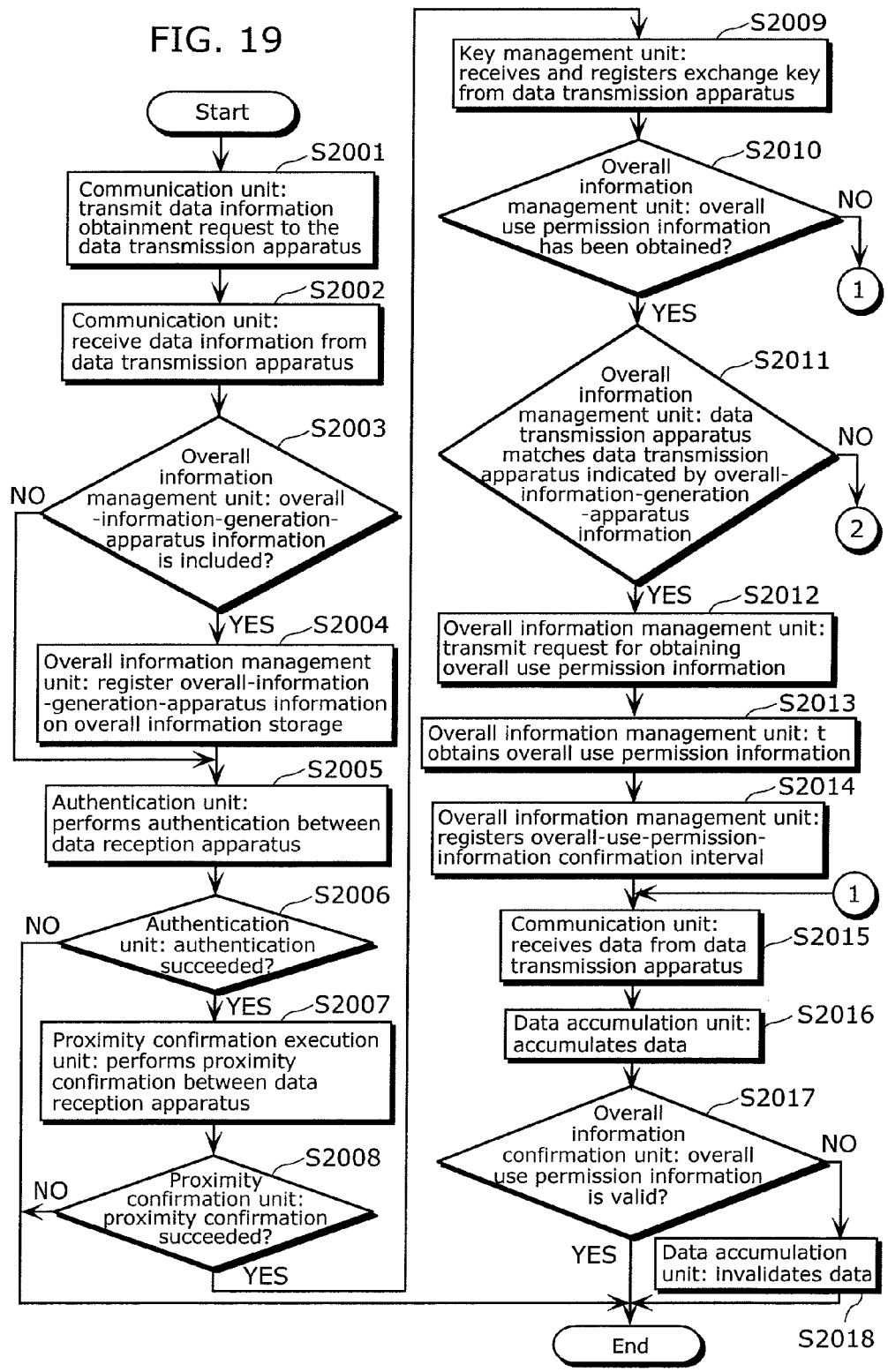
FIG. 19 is a flowchart which shows operations of the data reception apparatus according to the first embodiment.
Figure 20:
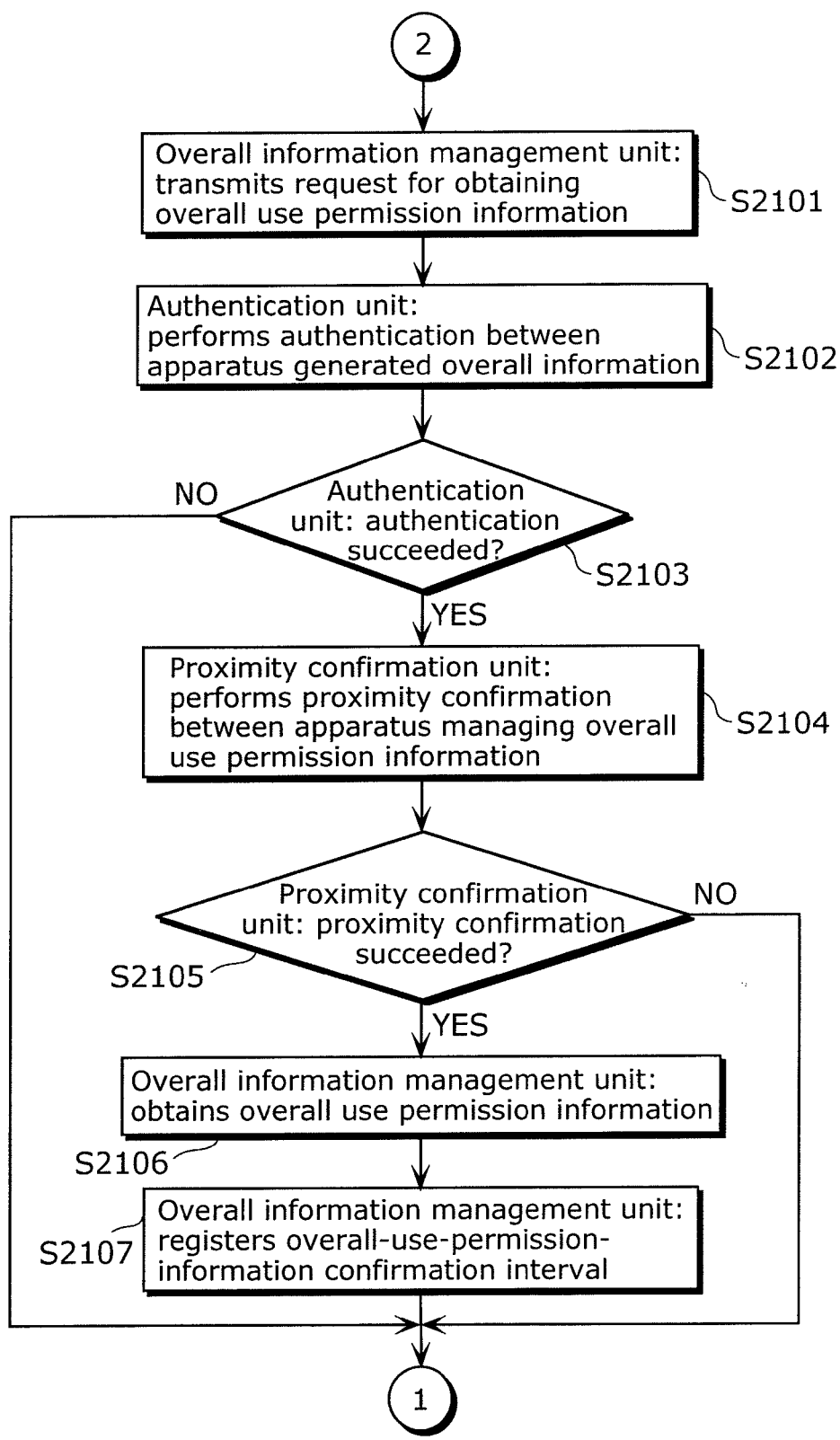
FIG. 20 is a flowchart which shows operations of the data reception apparatus when receiving overall use permission information from a data transmission apparatus other than the data transmission apparatus that accumulates copyrighted data according to a first embodiment.
Figure 21:
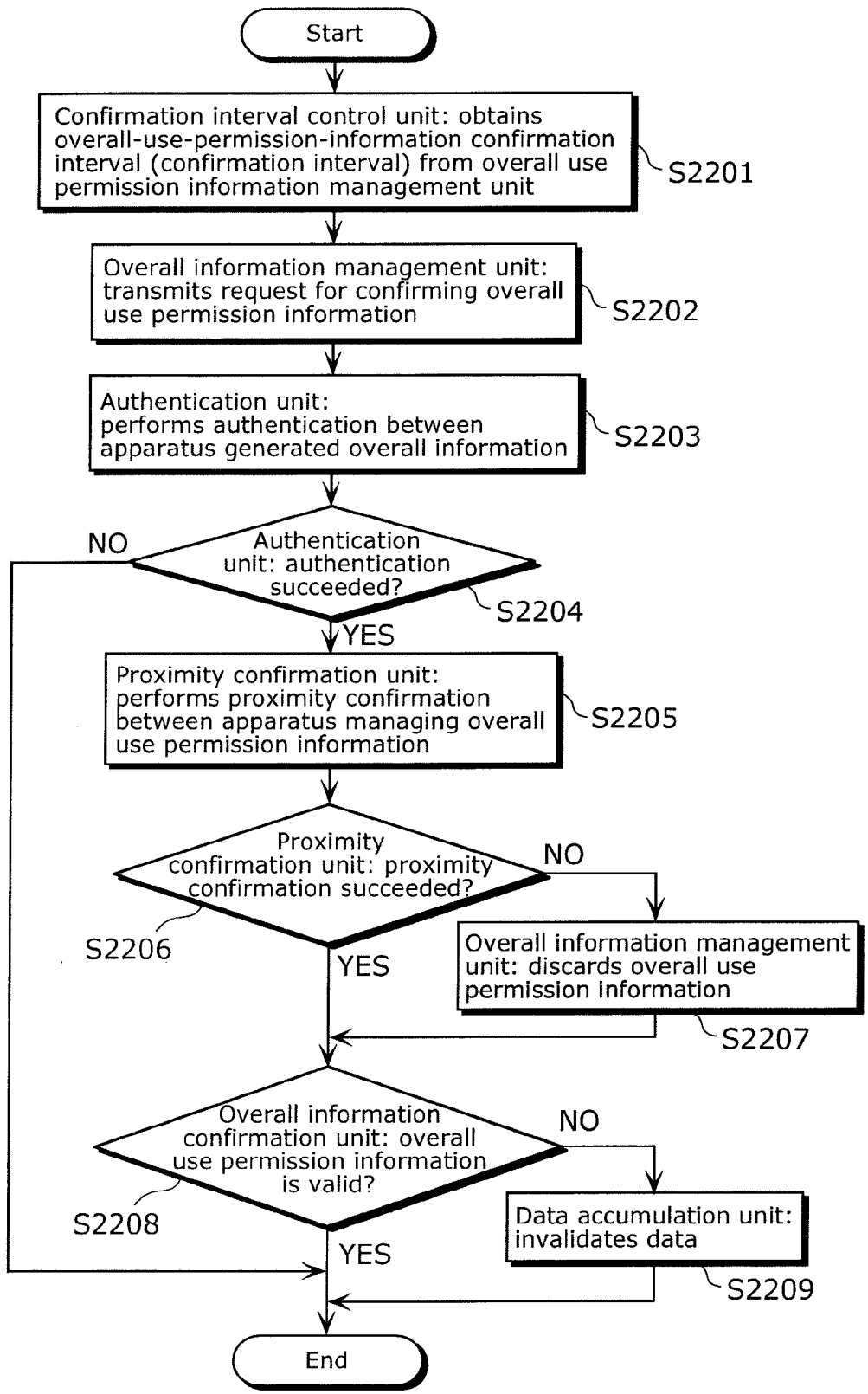
FIG. 21 is a flowchart which shows operations of the data reception apparatus when performing confirmation processing of overall information according to the first embodiment.

FIGS. 19 to 21 are flowcharts which show detailed operational flows of the data reception apparatus 110

The communication unit 1101 transmits the data information obtainment request to the data transmission apparatus 100 (S2001). The process of obtaining the data information 601 in Step S2001 is triggered by an input from a user and the like. The method of starting the data information obtainment processing is not limited to the above-described method.

Next, the communication unit 1101 receives the data information 601 from the data transmission apparatus 100 (S2002).

The overall information management unit 1102 analyzes the received data information 601 to determine whether or not the overall-information-generation-apparatus information 602 is included (S2003). When it is determined that the overall-information-generation-apparatus information is included, the overall information management unit 1102 adds the "data identifier 603" and the "overall-information-generation-apparatus information 602" to the management table of overall use permission information 600 (S2004).

Next, the authentication unit 1108 performs authentication between the data transmission apparatus 100 (S2005). When the authentication fails, the communication is ended (S2006).

When the authentication succeeds, the proximity confirmation unit 1007 performs proximity confirmation between the data transmission apparatus 100 using the RTT (S2007).

When the proximity confirmation using the RTT does not complete within a predetermined time and fails, the communication is ended (S2008).

When the proximity confirmation using the RTT succeeds, the key management unit 1109 receives the exchange key from the data transmission apparatus 100 (S2009). Since the exchange key has been encrypted by the authentication key shared with the data transmission apparatus 100 in the authentication, the key management unit 1109 decrypts the exchange key using the authentication key.

Next, the overall information management unit 1102 confirms whether or not the overall use permission information 500 related to the overall-information-generation-apparatus information 602 has been obtained, and performs data obtainment processing when the overall use permission information 500 has been obtained (S2010). When the overall use permission information 500 has not been obtained, the overall information management unit 1102 confirms whether or not the overall-information-generation-apparatus information 602 matches the data transmission apparatus 100 (S2011). When the apparatus indicated by the overall-information-generation-apparatus information 602 is a data transmission apparatus different from the data transmission apparatus 100, overall information obtainment processing is newly carried out after performing the proximity confirmation using the RTT on the data transmission apparatus indicated by the overall-information-generation-apparatus information 602. The overall information obtainment processing will be described later. When the apparatus indicated by the overall-information-generation-apparatus information 602 is the same data transmission apparatus as the data transmission apparatus 100, the overall information management unit 1102 transmits the request for obtaining overall use permission information to the data transmission apparatus 100 (S2012).

The overall information management unit 1102 receives the overall use permission information 500 from the data transmission apparatus 100 after transmitting the request for obtaining overall use permission information (S2013). The overall use permission information 500 received from the data transmission apparatus 100 includes "overall-use-permission-information identifier 501" and "overall-use-permission-information confirmation interval 502". It is to be noted that the overall use permission information 500 received from the data transmission apparatus 100 is not limited to the above information.

The overall information management unit 1102 registers the received "overall-use-permission-information identifier 501" and "overall-use-permission-information confirmation interval 502" on the management table of overall use permission information 600 in addition to the "data identifier 603" and "overall-information-generation-apparatus information 602" which has already been registered.

Next, the communication unit 1101 receives encrypted copyrighted data 201 from the data transmission apparatus 100 (S2015).

The data accumulation unit 1105 accumulates the copyrighted data 201 received by the communication unit 1101 (S2016). The communication unit 1101 may decrypt the copyrighted data 201 received from the data transmission apparatus 100 using the encryption key generated from the exchange key managed by the key management unit 1007 and then accumulate the decrypted copyrighted data 201 in the data accumulation unit 1105. A method of decrypting the copyrighted data 201 is not described in the present application, but is described by the aforementioned Non-Patent Reference 3 in detail.

The overall information confirmation unit 1103 examines whether or not the overall use permission information 500 related to the copyrighted data 201 registered on the management table of overall use permission information 600 is valid by requesting the overall information management unit 1102 (S2017).

In the case where the overall use permission information 500 has been discarded, the overall information confirmation unit 1103 invalidates the copyrighted data 201 accumulated in the data accumulation unit 1105. Invalidation is this case means that the copyrighted data 201 is made into a state that the copyrighted data 201 cannot be accessed properly even when accumulated in the data accumulation unit 1105. For example, the copyrighted data 201 may be accumulated in an encrypted state. It is to be noted that the method of invalidating the copyrighted data 201 is not limited to encryption.

Next, overall information obtainment processing will be explained.

FIG. 20 is a flowchart which shows details of the overall information obtainment.

The overall information management unit 1102 transmits a request for obtaining overall use permission information to the data transmission apparatus 100 (S2101).

Next, processes of Steps S2102 to S2105 are performed. Since these processes are the same as the aforementioned processes of Steps S2005 to S2008, detailed descriptions will be omitted. Further, since processes of Steps S2106 to S2107 are the same as the aforementioned processes of Steps S2013 to S2014, detailed descriptions will be omitted.

Next, the confirmation processing of overall information will be explained.

FIG. 21 is a flowchart which shows details of the confirmation processing of overall information.

First, the confirmation interval control unit 1106 obtains the overall-use-permission-information confirmation interval 502 from the overall information management unit 1102 and starts measuring a confirmation interval (S2201). When the confirmation interval has been exceeded, the overall information management unit 1102 obtains the overall-information-generation-apparatus information 602 from the management table of overall use permission information 600 and transmits the request for confirming overall use permission information to the data transmission apparatus that corresponds to the apparatus indicated by the information (S2202). The request for confirming overall use permission information may be transmitted before confirmation interval has been exceeded. This is effective because retry processing can be performed until the confirmation interval has been exceeded even when the confirmation processing of overall use permission information fails.

Next, processes of Steps S2203 to S2206 are performed. Since these processes are the same as the aforementioned processes of Steps S2005 to S2008, detailed descriptions will be omitted.

In Step S2206, when the proximity confirmation using the RTT fails, the overall information management unit 1102 discards the "overall-use-permission-information identifier 501" and "overall-use-permission-information confirmation interval 502" related to the overall-information-generation-apparatus information 602 in the overall information management table 600 (S2207).

Next, processes of Steps S2208 to S2209 are performed. Since these processes are the same as the aforementioned processes of Steps S2017 to S2018, detailed descriptions will be omitted.

According to the data transmission apparatus and the data reception apparatus of the present embodiment described above, it is possible to limit, to the range of proximity confirmation using the RTT, a range in which an apparatus that can accumulate a copy of the copyrighted data 201 exists. In addition to this, since the overall use permission information 500 can be managed separately from the copyrighted data 201, it is possible to freely move the copyrighted data 201 within the range of proximity confirmation. Therefore, since the copyrighted data 201 can be moved freely within a private use range, the copyrighted data 201 accumulated in the data transmission apparatus 100 (server) can be temporarily moved to a network HDD or a DVD recorder.

(Second Embodiment)

Next, a second embodiment according to the present invention will be described in detail with reference to the drawings.

Figure 22:
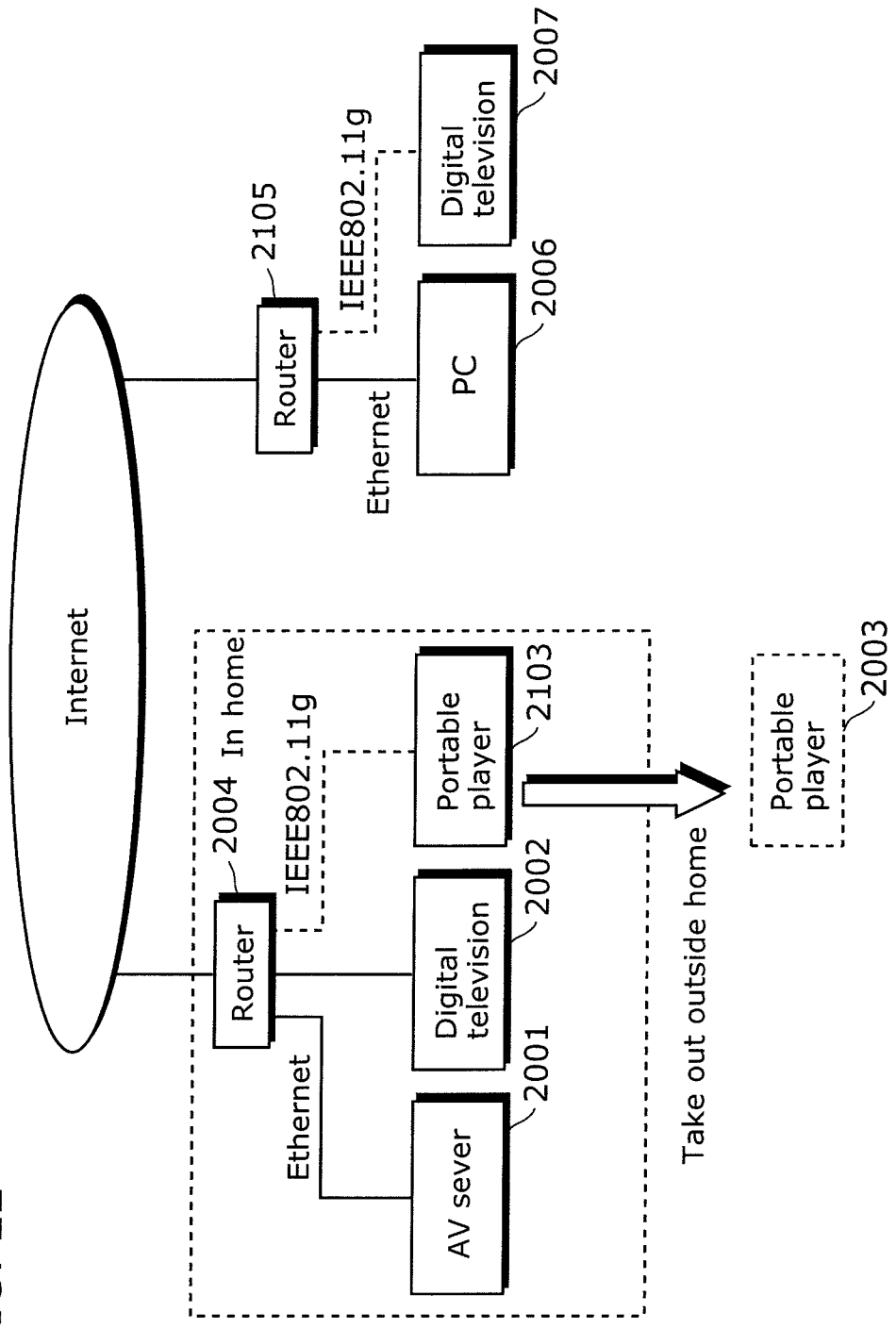
FIG. 22 is a diagram which shows a configuration of the transmission and reception system according to a second embodiment.

FIG. 22 is a block diagram which shows a configuration of the transmission and reception system according to the present embodiment. This transmission and reception system is an example of a transmission and reception system which includes a transmission apparatus that transmits content of a digital copyrighted work and a reception apparatus that receives and uses content. Here, a communication system is shown, which includes apparatuses in a home 2001 to 2004 and apparatuses outside the home 2005 to 2007 that are connected to the apparatuses in the home 2001 to 2004 via the Internet. It is to be noted that the transmission apparatus according to the present embodiment is an example of the data transmission apparatus according to CLAIMS, the reception apparatus is an example of the data reception apparatus according to CLAIMS, and the transmission and reception system is an example of the data transmission and reception system according to CLAIMS.

As shown in FIG. 22, an AV sever 2001 that is the transmission apparatus, a digital television 2002 that is the reception apparatus, a portable player 2003, and a router 2004 are placed in a home. Here, the router 2004 is connected to the AV server 2001 and the digital television 2002 via Ethernet (registered trademark) and to the portable player 2003 via a wireless medium (IEEE802.11b).

Further, a router 2005 and a PC 2006 and a digital television 2007 which are reception apparatuses are placed outside the house. Here, the router 2005 is connected to the PC 2006 via the Ethernet (registered trademark) and to the digital television 2007 via a wireless medium (IEEE802.11b).

Figure 23:
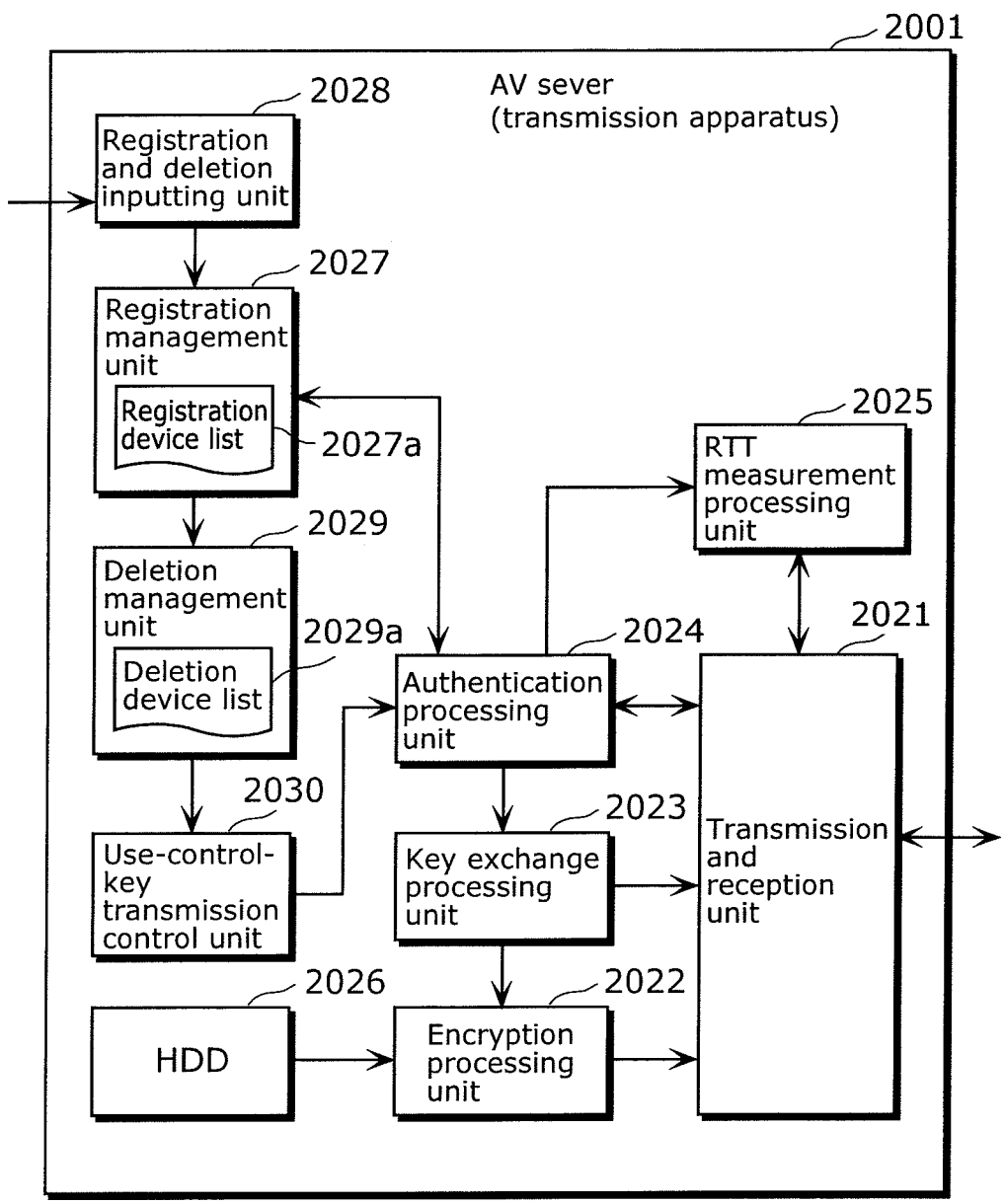
FIG. 23 is a block diagram which shows a configuration of an AV sever that is included in the transmission and reception system according to the second embodiment.

FIG. 23 is a block diagram which shows a configuration of an AV sever 2001 that is the transmission apparatus of FIG. 22. The AV sever 2001 is a transmission apparatus that transmits content to each of the reception apparatuses and manages content use of the reception apparatus, such as a video and audio data record and reproduction apparatus, for example, and includes: a transmission and reception unit 2021; an encryption processing unit 2022; a key exchange processing unit 2023; an authentication processing unit 2024; an RTT measurement processing unit 2025; a hard disk drive (HDD) 2026; a registration management unit 2027; a registration and deletion inputting unit 2028; a deletion management unit 2029; a use-control-key transmission control unit 2030.

Here, the use-control-key transmission control unit 2030; the authentication processing unit 2024; the key exchange processing unit 2023; and the transmission and reception unit 2021 correspond to a use control information transmission unit according to CLAIMS, the RTT measurement processing unit 2025 corresponds to a round trip time confirmation unit, the registration management unit 2027 corresponds to a registration management unit, and the deletion management unit 2029 corresponds to a deletion management unit.

The transmission and reception unit 2021 is a communication interface for transmitting content to a network and transmitting and receiving a request or a response to a request between another device connected to the network.

The encryption processing unit 2022 encrypts content reproduced by the HDD 2026.

The key exchange processing unit 2023 generates: an exchange key to be used by the reception apparatus for decrypting the encrypted content; and a use control key that is an example of use control information that enables use of the decrypted content in the reception apparatus, encrypts these keys by using authentication information transmitted from the authentication processing unit 2024, and outputs to the reception apparatus via the transmission and reception unit 2021.

The authentication processing unit 2024 receives an authentication request for obtaining exchange key and an authentication request for obtaining the use control key from the reception apparatus, performs authentication between the reception apparatus, shares authentication information with the reception apparatus, and receives certification information of the reception apparatus from the reception apparatus. Further, the authentication processing unit 2024, when receiving the authentication request for obtaining the use control key from the reception apparatus, outputs a transmission availability confirmation request including a device ID (identification information) of the reception apparatus to the use-control-key transmission control unit 2030, and thereby obtaining a result of transmission availability from the use-control-key transmission control unit 2030, and determines whether to perform (allow) or to reject the authentication request for obtaining the use control key from the reception apparatus based on the obtained result of transmission availability. In the case where it is determined to perform (allow) the authentication request for obtaining the use control key, the authentication processing unit 2024 passes the use control key to the reception apparatus by transmitting authentication information to the key exchange processing unit 2023, and notifies the registration management unit 2027 of a device ID of the reception apparatus to which the use control key has been transmitted by the key exchange processing unit 2023 in order to enable management of the reception apparatus by the registration management unit 2027.

The RTT measurement processing unit 2025 is a processing unit which determines whether or not the round trip time between the transmission apparatus and the reception apparatus is within a predetermined amount of time, and generates an RTT measurement request under the control of the authentication processing unit 2024, transmits the generated RTT measurement request to the reception apparatus via the transmission and reception unit 2021, and receives an RU-measurement-request response as a response to the RTT measurement request, thereby measuring the RTT from transmitting the RTT measurement request until receiving the RTT-measurement-request response. As a result, in the case where the RTT is equal to or less than a reference value (7 ms, for example), the RTT measurement processing unit 2025 determines that the reception apparatus is in proximity and outputs a result of the determination to the authentication processing unit 2024.

The HDD 2026 is a device for accumulation, such as a hard disk, which records and reproduces content.

Figure 24:
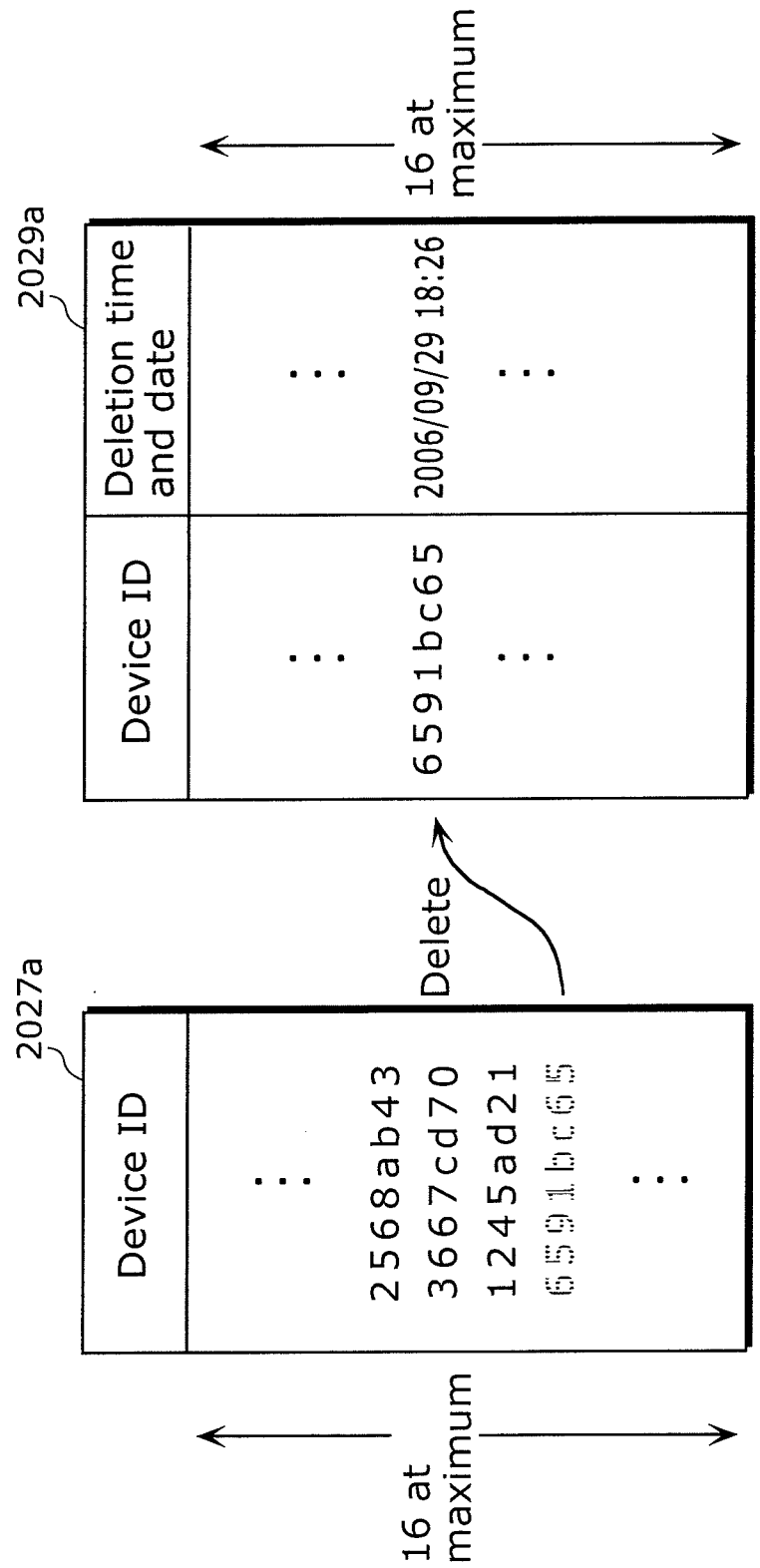
FIG. 24 is a diagram which shows a registration device list and a deletion device list included in the AV sever according to the second embodiment.

The registration management unit 2027 is a processing unit which registers, on a list, a device ID of the reception apparatus that is the destination of transmitting the use control key, and deletes the device ID from the list in the case where an instruction to delete the device ID registered on the list is received. More specifically, the registration management unit 2027 is a processing unit which manages the reception apparatus that includes the use control key transmitted from the AV sever 2001 by using a registration device list 2027a included therein, and receives, from the authentication processing unit 2024, the device ID of the reception apparatus to which the use control key was transmitted by the key exchange processing unit 2023, registers the device ID on the registration device list 2027a as shown in the diagram on the left of FIG. 24 in the case where the received device ID has not been registered on the registration device list 2027a, and outputs a registration notification that includes the device ID to the deletion management unit 2029. Further, in the case where a deletion request that includes the device ID and transmitted from the registration and deletion inputting unit 2028 is received, the registration management unit 2027 deletes the device ID from the registration device list 2027a and outputs a deletion notification to the deletion management unit 2029. It is to be noted that the registration device list 2027a is a data table that shows a list of the reception apparatuses that includes the use control key transmitted by the AV sever 2001, that is, the reception apparatuses that can use the content transmitted by the AV sever 2001, and has a storage capacity that can register a predetermined fixed number of device IDs (device IDs of 16 reception apparatuses at a maximum in the present embodiment)

When obtaining the deletion request of the reception apparatus from a user via Graphical User Interface (GUI), the registration and deletion inputting unit 2028 outputs the deletion request that includes the device ID of the reception apparatus to the registration management unit 2027, so that the device ID of a target reception apparatus is deleted from the registration device list 2027a by the registration management unit 2027.

The deletion management unit 2029 is a processing unit that registers on a list and manages the device ID deleted from the registration device list 2027a by the registration management unit 2027. More specifically, the deletion management unit 2029 is a processing unit that performs the management of storing for a predetermined period the reception apparatus deleted by the registration management unit 2027 from the registration device list 2027a, by using the deletion device list 2029a included therein, and when the deletion notification is received from the registration management unit 2027, registers that accordingly on the deletion device list 2029a as shown in a diagram on the right in FIG. 24. To be more specific, the deletion management unit 2029 associates the device ID of the deleted device included in the deletion notification with a current time and date detected by a built-in calendar timer (that is, the time and date when deleted) and registers on the deletion device list 2029a. It is to be noted that the deletion device list 2029a is a data table which shows a list of the reception apparatuses that have been deleted from the registration device list 2027a and have not passed a predetermined amount of time ("delay time" to be described below) from deletion. In the present embodiment, it is possible to register the device ID and deletion time and date for 16 reception apparatuses at a maximum.

Further, when receiving the registration notification from the registration management unit 2027, the deletion management unit 2029 examines whether or not the registered reception apparatus is registered on the deletion device list 2029a and deletes the reception apparatus from the deletion device list 2029a in the case where the registered reception apparatus is registered. Further, when requested by the use-control-key transmission control unit 2030 to refer to the deletion device list 2029a, the deletion management unit 2029 returns information on the deletion device list 2029a as a response to the request. At this time, the deletion management unit 2029 examines the deletion device list 2029a and, in the case where a predetermined delay time (Td) has passed since the reception apparatus has been deleted, transmits information on the deletion device list 2029a after deleting from, and updating the deletion device list 2029a. It is to be noted that the delay time (Td) is set as a value equal to or greater than a confirmation time (Tc) of the reception apparatus. Here, the confirmation time (Tc) is a time interval that the reception apparatus should confirm connection to the transmission apparatus, more specifically, a time predetermined as a time interval that the reception apparatus obtains a new use control key from the transmission apparatus, and in other words, a validity period of the use control key held by the reception apparatus.

The use-control-key transmission control unit 2030 is a processing unit which, when receiving from the registration device list 2027a a request for the new use control key from the reception apparatus, determines transmission availability of the use control key depending on a registration state of the registration device list 2027a and the deletion device list 2029a, generates use control information (use control key) that is the information enables use of content by the reception apparatus in the case where the round trip time between the transmission apparatus and the reception apparatus is determined to be within a predetermined amount of time by the RTT measurement processing unit 2025, and transmits the generated use control information to the reception apparatus. More specifically, the use-control-key transmission control unit 2030, when receiving a transmission availability confirmation request from the authentication processing unit 2024, refers to the registration device list 2027a for the device ID included in the transmission availability confirmation request, and notifies the authentication processing unit 2024 of "transmission available" when the device ID has been registered. When the device ID has not been registered, the use-control-key transmission control unit 2030 confirms the registration number of the current registration device list 2027a, notifies the authentication processing unit 2024 of "transmission unavailable" when the registration number reaches the maximum registration number (16, for example), refers to the deletion device list 2029a for the device ID when the registration number is less than the maximum registration number, and notifies the authentication processing unit 2024 of "transmission available" when the device ID has been registered. In the case where the device ID has not been registered, the use-control-key transmission control unit 2030 confirms the total number of the registration device list 2027a and the deletion device list 2029a, notifies the authentication processing unit 2040 of "transmission unavailable" when the total number reaches the maximum total number (32, for example), and notifies the authentication processing unit 2040 of "transmission available" when the total number is less than the maximum total number.

Figure 25:
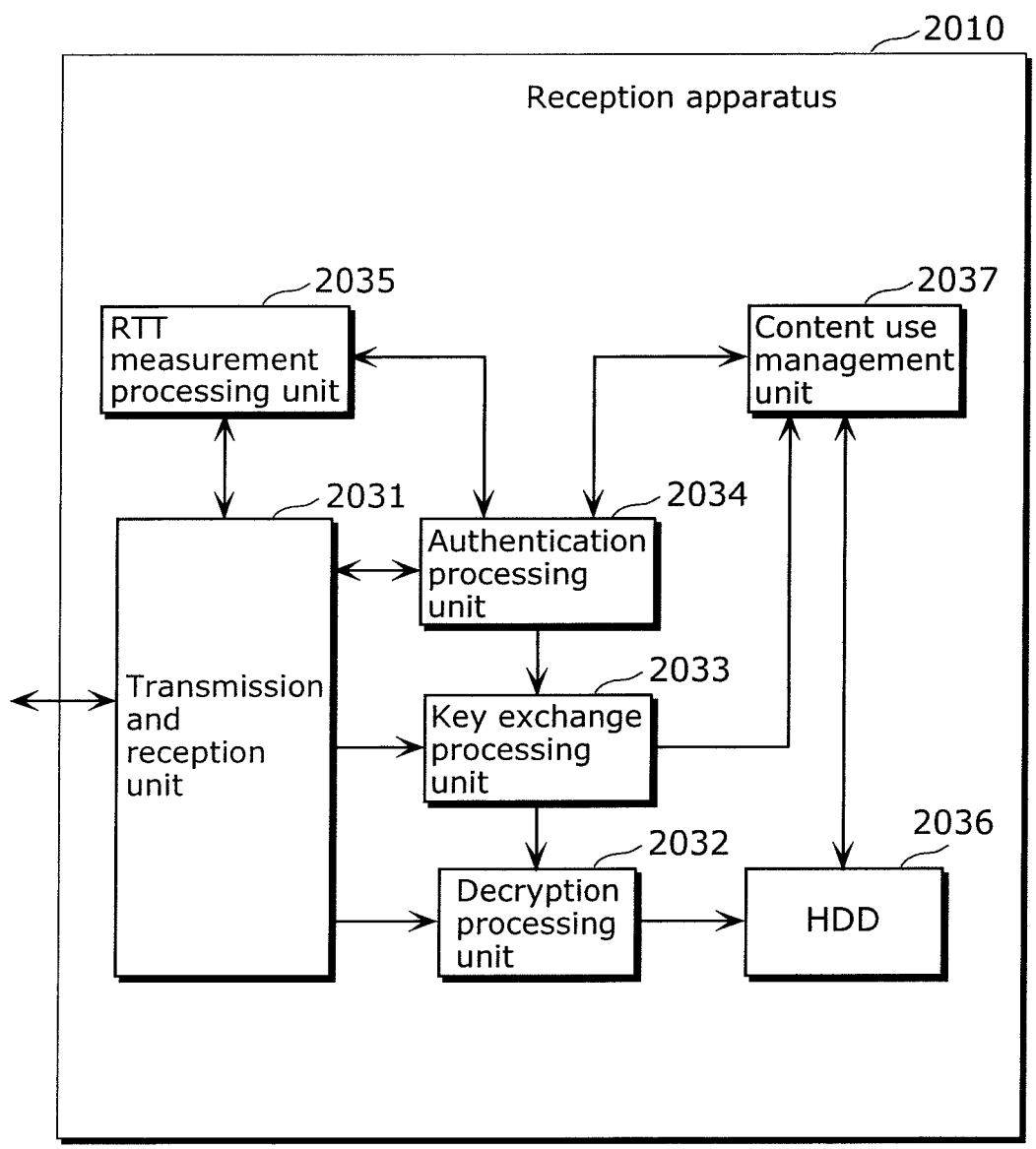
FIG. 25 is a block diagram which shows a configuration of the reception apparatus that is included in the transmission and reception system according to the second embodiment.

FIG. 25 is a block diagram which shows a configuration common to a digital television 2002, a portable player 2003, a PC 2006, and a digital television 2007 which are the reception apparatuses (here, a "reception apparatus 2010").

The reception apparatus 2010 is an apparatus that receives content transmitted from the AV sever 2001 that is the transmission apparatus and uses the content by recording, reproducing, or the like, and includes a transmission and reception unit 2031, a decryption processing unit 2032, a key exchange processing unit 2033, an authentication processing unit 2034, an RTT measurement processing unit 2035, an HDD 2036, and a content use management unit 2037. Here, the content use management unit 2037 corresponds to a content use management unit according to the CLAIMS.

The transmission and reception unit 2031 is a communication interface for receiving content transmitted via a network or transmitting and receiving a request or a response for a request to or from other devices connected to the network.

The decryption processing unit 2032 generates a decryption key by using an exchange key received from the key exchange processing unit 2033, and decrypts the encrypted content received by the transmission and reception unit 2031. The content decrypted to a plain text by the decryption processing unit 2032 is outputted by the HDD 2036 and recorded.

The key exchange processing unit 2033 decrypts the encrypted exchange key and the encrypted use control key received by the transmission and reception unit 2031 by using the authentication information received from the authentication processing unit 2034 and outputs the decrypted exchange key to the decryption processing unit 2032 and decrypted use control key to the content use management unit 2037.

The authentication processing unit 2034 requests the authentication processing unit 2024 of the AV sever 2001 for starting authentication for obtaining exchange key and authentication for obtaining use control key, performs authentication, and shares authentication information with the AV server 2001. Further, the authentication processing unit 2034 transmits certification information including the device ID of the reception apparatus to the AV sever 2001 via the transmission and reception unit 2031, receives certification information of the AV sever 2001 from the AV sever 2001, extracts the device ID from the received certification information, and manages the extracted device ID as identification information of the AV sever 2001.

The RTT measurement processing unit 2035, when receiving an RTT measurement request transmitted from the AV sever 2001, generates a response to the RTT measurement request, and transmits to the AV sever 2001 via the transmission and reception unit 2031.

The HDD 2036 is an accumulation device, such as a hard disk, which records or reproduces content decrypted by the decryption processing unit 2032. It is to be noted that the HDD 2036, when recording content, records the device ID of the AV sever 2001 that is the source of transmission as attached information.

The content use management unit 2037 is a processing unit that requests a use control key from the transmission apparatus and receives and holds the use control key transmitted from the transmission apparatus, and repeats, after receiving the use control key, the processes of requesting a new use control key from the transmission apparatus within a predetermined confirmation time and holding the use control key transmitted from the transmission apparatus, and discards, among use control keys which have been held, the use control key of which the predetermined confirmation time has passed since the use control key has been obtained More specifically, the content use management unit 2037 receives a use control key from the key exchange processing unit 2033 and a device ID of the AV sever 2001 from the authentication processing unit 2043, and stores the use control key and the device ID as use control information of the content received from the AV sever 2001, together with time and date of reception. When the HDD 2036 reproduces content, the content use management unit 2037 examines the device ID of the AV sever 2001 that is attached information of the content, to determine whether or not a corresponding use control key of the same device ID is held, and permits reproduction only in the case where the use control key is held, that is, reproduction is prohibited in the case where the use control key is not held. Further, the content use management unit 2037 outputs an execution request of authentication for obtaining use control key to the authentication processing unit 2034 periodically within the fixed or set confirmation time (Tc) and obtains the use control key from the from the AV sever 2001. The obtained use control key is discarded when the confirmation time (Tc) has passed. This is for preventing use of the reception apparatus that accumulates content and use control keys, outside the home, by repeating the processing (periodic confirmation processing) of reissuing the use control key for the reception apparatus 2010 performed by the AV sever 2001 on condition that the validity period of the use control key is limited to a predetermined period and the round trip time is a predetermined amount of time.

Next, operations of a transmission and reception system configured as described above according to the present embodiment will be described.

Figure 26:
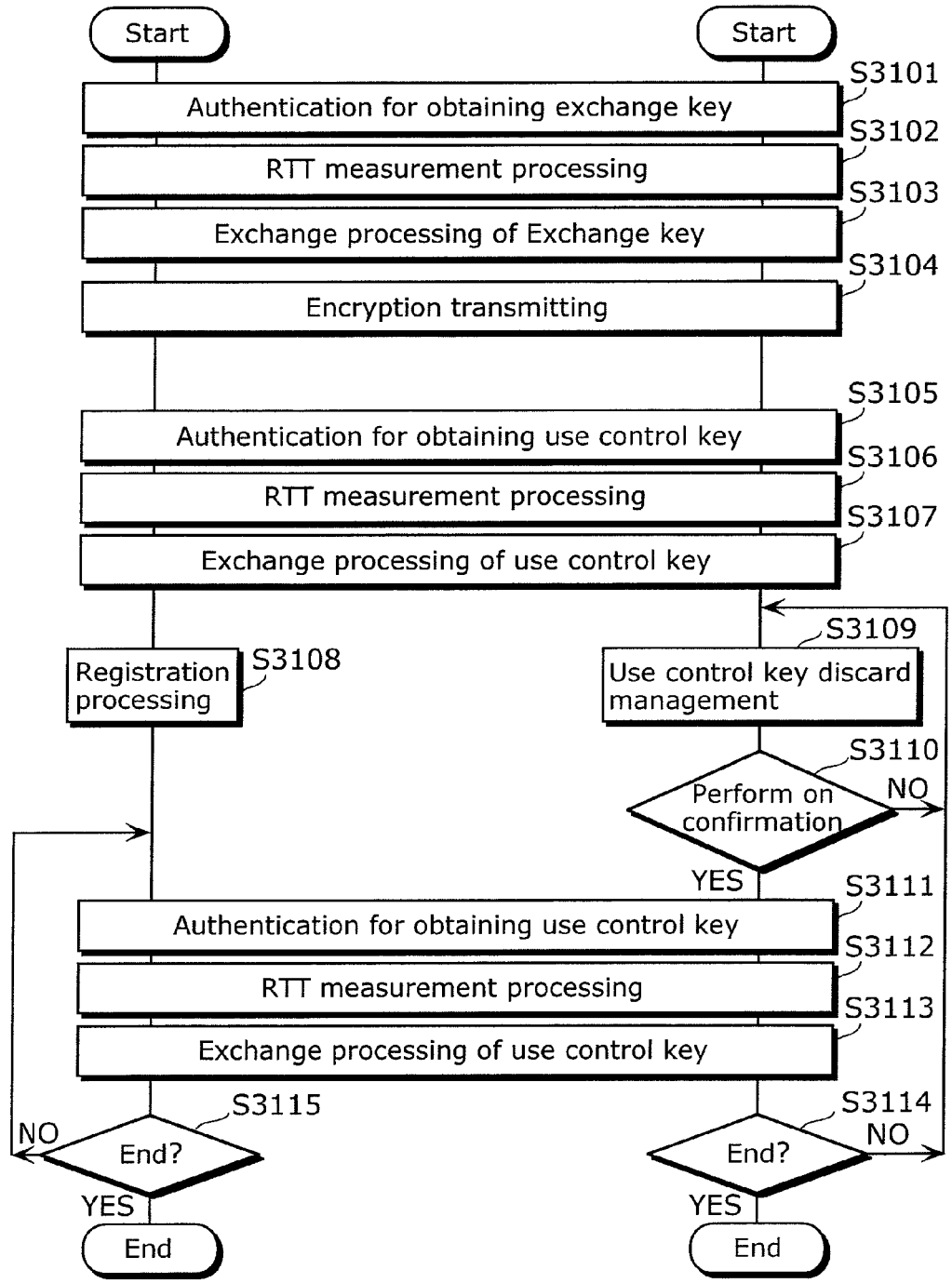
FIG. 26 is a diagram which shows a sequence of an overall processing of the transmission and reception system according to the second embodiment.

FIG. 26 is a diagram which shows an overall operational sequence of the transmission and reception system according to the present embodiment. This diagram shows an operational flow of the AV sever 2001 (transmission apparatus) and the reception apparatus 2010, which includes: processing from an authentication for obtaining an exchange key to an encryption transmission; processing from a first authentication for obtaining a use control key to a use control key exchange process; and processing from a second or later authentication for obtaining use control key to the use control key exchange process which is the periodic confirmation processing.

First, the authentication processing unit 2034 of the reception apparatus 2010 transmits the authentication request for obtaining exchange key to the AV sever 2001 and starts an authentication for obtaining an exchange key S3101.

When the authentication for obtaining an exchange key S3101 ends, the RTT measurement processing unit 2025 of the AV sever 2001 measures an RTT by transmitting an RTT measurement request to the reception apparatus 2010 (S3102). In the case where the result shows that the RTT measurement processing can be performed properly and an obtained measurement value RTT is equal to or less than a reference value (7 ms), the RTT measurement processing unit 2025 notifies the authentication processing unit 2024 accordingly, so that the processing goes to the next process S3103, or otherwise (not ended properly), the processing ends for an error.

In the AV sever 2001, the authentication processing unit 2024 that received notification of a proper ending from the RTT measurement processing unit 2025, transmits authentication information to the key exchange processing unit 2023, and the key exchange processing unit 2023 that received the authentication information encrypts the exchange key using the authentication information and transmits the encrypted exchange key to the reception apparatus 2010 via the transmission and reception unit 2021 (S3103).

When the exchange key exchange process S3103 ends, the reception apparatus 2010 requests content from the AV sever 2001, receives encrypted content transmitted from the AV sever 2001 in response to the request, decrypts the received encrypted content by using a decryption key generated from the exchange key, and records the decrypted content on the HDD 2036 (S3104).

Next, the authentication processing unit 2034 of the reception apparatus 2010, after receiving and recording the content, starts an authentication for obtaining a use control key S3105 by transmitting the authentication request for obtaining the use control key to the AV sever 2001.

When In the case where the result shows that the authentication for obtaining use control key S3105 ends, the RTT measurement processing unit 2025 of the AV sever 2001 measures the RTT by transmitting the RTT measurement request to the reception apparatus 2010 (S3106). In the case where the result shows that the RTT measurement processing can be performed properly and an obtained measurement value RTT is equal to or less than the reference value (7 ms), the RTT measurement processing unit 2025 notifies the authentication processing unit 2024 accordingly, so that the processing goes to the next process S317, or otherwise (not ended properly), the processing ends for an error (S3106).

In the AV sever 2001, the authentication processing unit 2024 that received notification of a proper ending from the RTT measurement processing unit 2025, transmits authentication information to the key exchange processing unit 2023, and the key exchange processing unit 2023 that received the authentication information encrypts the use control key using the authentication information and transmits the encrypted exchange key to the reception apparatus 2010 via the transmission and reception unit 2021. In the reception apparatus 2010 that received the use control key, the key exchange processing unit 2033 decrypts the encrypted use control key by using the authentication information received from the authentication processing unit 2034 and transmits the decrypted use control key to the content use management unit 2037. The content use management unit 2037 records the received use control key, the device ID of the AV sever 2001, and reception time and date (S3107).

In the AV sever 2001, when the use control key exchange process ends, the registration management unit 2027, in order to manage the reception apparatus 2010 that transmitted the use control key, registers the device ID on the registration device list 2027a, and the deletion management unit 2029 deletes the device ID from the deletion device list 2029a when it has been registered thereon (S3108).

Further, in the reception apparatus 2010, the content use management unit 2037 examines the reception time and date for each use control key that is held, and carries out a discard management that discards the use control key when the confirmation time has passed (S3109). Then, the content use management unit 2037 determines whether or not the use control key obtainment processing should be initiated (perform on confirmation) based on the confirmation time period (S3110), and the processing goes to the nest step when determined to be initiated (Yes, in S3110), or otherwise goes back to Step S3109.

When the use control key obtainment processing is initiated, the AV sever 2001 and the reception apparatus 2010 carry out a series of authentications for obtaining a use control key (S3111), the RTT measurement processing (S3112), and the use control key exchange processing (S3113) and then obtains the use control key. It is to be noted that the series of possessing (the use control key obtainment processing) S3111 to S3113 are the same procedure as the aforementioned use control key obtainment processing S3105 to S3107.

When the use control key obtainment processing ends, the AV sever 2001 and the reception apparatus 2010 determine whether or not to end the operational sequence (S3114 and S3115), periodically perform the use control key obtainment processing when determined to continue (No, in S3114), or otherwise, end the processing when determined not to continue (Yes, in S3114).

Figure 27:
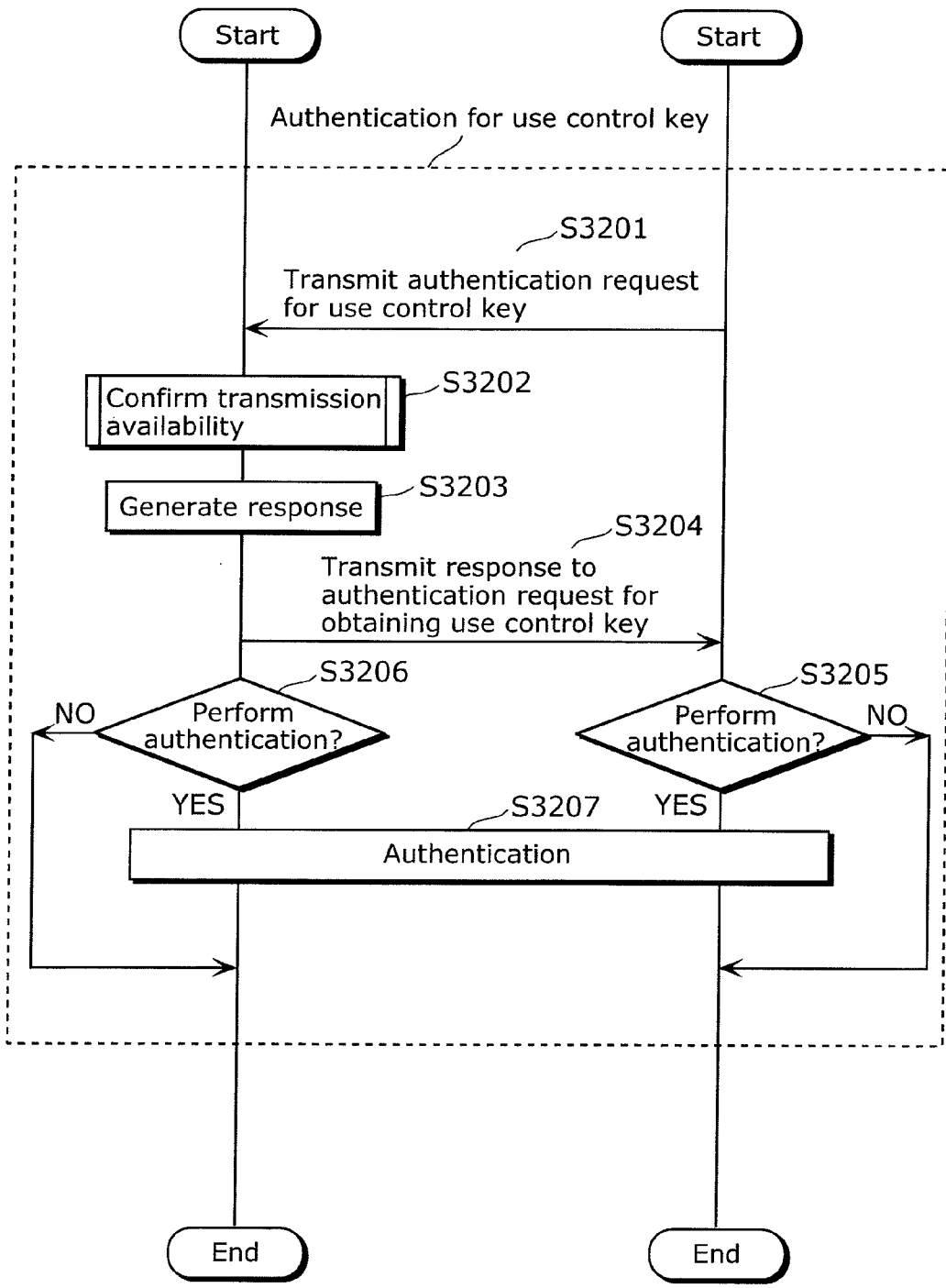
FIG. 27 is a diagram which shows a detailed sequence of an authentication processing for a use control key in the sequence of the overall processing of FIG. 26.

FIG. 27 is a diagram which shows a detailed sequence of the authentication processing for a use control key (S3105 and S3111) of FIG. 26.

First, the reception apparatus 2010 transmits a request for authentication of the use control key to the AV sever 2001 (S3201). The AV sever 2001 confirms transmission availability based on a result of confirmation of output availability performed by the use-control-key transmission control unit 2030 (S3202), and as a result, generates a rejection response in the case where it is determined that the use control key cannot be transmitted and generates a permission response in the case where it is determined that the use control key can be transmitted (S3203), and transmits the response to the reception apparatus 2010 as a response to the authentication request for use control key (S3204).

Then, the AV sever 2001 and the reception apparatus 2010 determines whether or not to perform the authentication for obtaining use control key according to the response generated in the response generation Step S3203 (S3205 and S3206), and performs authentication when it is determined to perform (S3207) or ends the processing when it is determined not to perform. More specifically, the authentication S3207 is performed in the case where it is determined that the use control key can be transmitted in Step S3202, or the processing ends in the case where it is not determined that the use control key can be transmitted.

According to the operations as described above, since the reception apparatus 2010 that has been deleted once from the registration device list 2027a is also registered on the deletion device list 2029a and managed, all of the reception apparatus 2010 that have the possibility of holding the use control key corresponding to the received content are managed. Therefore, even when the operations to receive content and a use control key and to delete registration are repeated in plural reception apparatuses 2010, a total number of the reception apparatus 2010 that can use the content is accurately managed and limited.

Figure 28:
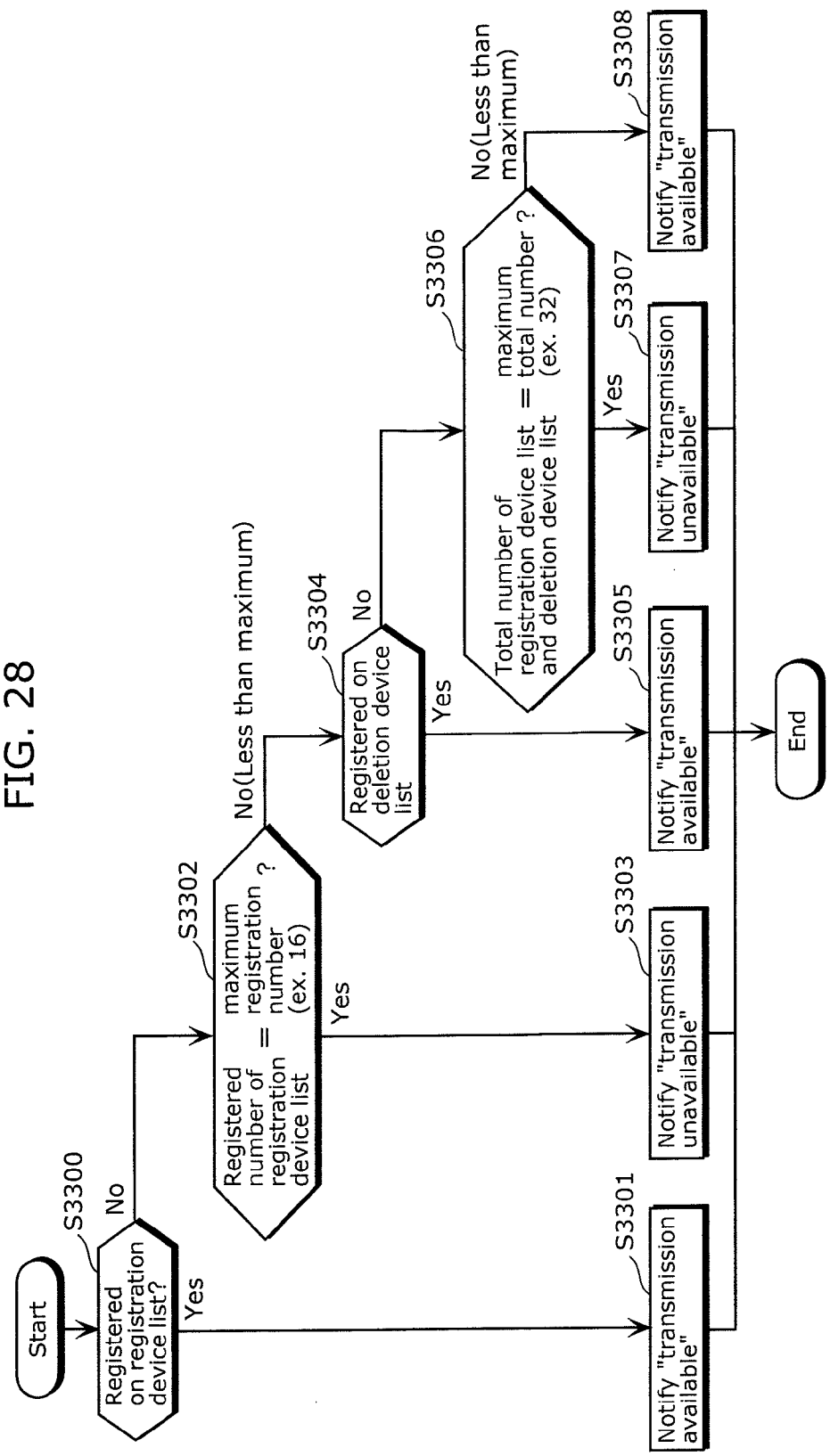
FIG. 28 is a flowchart which shows a detailed procedure for determining whether or not transmission is possible in the authentication processing for the use control key of FIG. 27.

FIG. 28 is a flowchart which shows a detailed procedure for transmission availability determination step (S3202) of FIG. 27. The use-control-key transmission control unit 2030, when receiving the transmission availability confirmation request from the authentication processing unit 2024, refers to the registration device list 2027a for the device ID included in the transmission availability confirmation request (S3300), and when it is registered (Yes, in S3300), notifies the authentication processing unit 2024 of "transmission available" (S3301).

On the other hand, when it is not registered (No, in S3300), the use-control-key transmission control unit 2030 examines the registration number on the registration device list 2027a (S3301) and, when the registration number reaches the maximum registration number (16, in this case) (Yes, is S3302), notifies the authentication processing unit 2024 of "transmission unavailable" (S3303).

On the other hand, when the registration number is less than the maximum registration number (No, in S3302), the use-control-key transmission control unit 2030 refers to the deletion device list 2029a for the device ID (S3304) and, when it is registered (Yes, in S3304), notifies the authentication processing unit 2024 of "transmission available" (S3305).

On the other hand, when it is not registered (No, in S3304), the use-control-key transmission control unit 2030 examines the total number of the registration device list 2027a and the deletion device list 2029a (S3306) and, when the total number reaches the maximum total number (32, in this case) (Yes, in S3306), notifies the authentication processing unit 2024 of "transmission unavailable" (S3307) or, when the total number is less than the maximum total number (No, in S3306), notifies the authentication processing unit 2024 of "transmission available" (S3308).

As described above, the use-control-key transmission control unit 2030 returns, in response to the transmission availability confirmation request, a response of "permission" to the reception apparatus 2010 registered on the registration device list 2027a and, in the case where the reception apparatus 2010 is not registered on the registration device list 2027a, returns the response of "permission" only when the current registration number on the registration device list 2027a does not reach the maximum and the reception apparatus 2010 is registered on the deletion device list 2029a, and when a total number of the current registration number on the registration device list 2027a and the current registration number on the deletion device list 2029a does not reach the maximum, and returns the response of "rejection" in other cases. With this, content can be used for a predetermined period even by a reception apparatus deleted from the registration device list 2027a, and it is possible to newly register (number restriction on the reception apparatus) a reception apparatus that can use content within a predetermined number range, including the reception devices deleted from the registration device list.

More specifically, since the maximum total number of available reception devices is set as 2N, where N is the maximum registration number, even when all entry of registered reception apparatus is deleted and exchanged for another reception apparatus by a user, the total of the deletion device and the registration device becomes 2N and does not exceeds the maximum total number, so that the user substantially receives no restriction on changing the reception apparatus.

Figure 29:
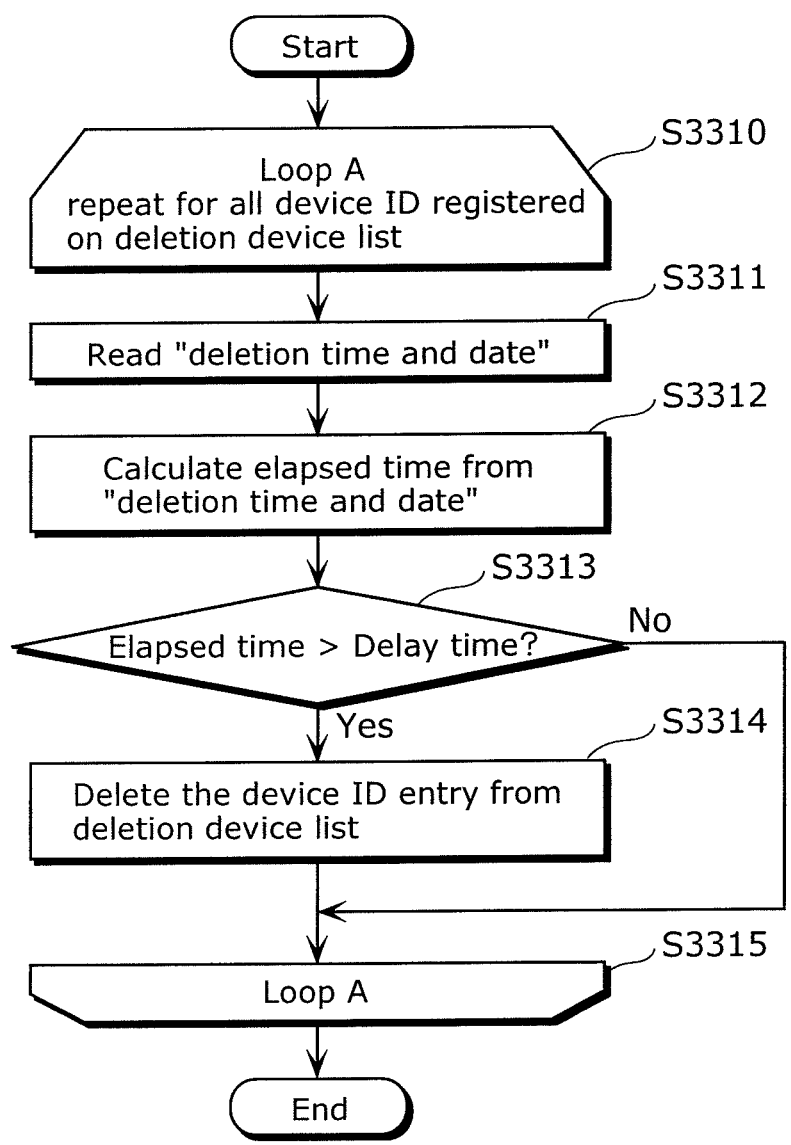
FIG. 29 is a flowchart which shows a procedure for updating the deletion device list in the AV sever according to the second embodiment.

FIG. 29 is a flowchart which shows a procedure for updating the deletion device list in the AV sever. This flowchart shows an updating procedure of the deletion device list 2029a to be performed when the deletion management unit 2029 that receives a request from the use-control-key transmission control unit 2030 for a reference to the deletion device list 2029a (Step S3300 of FIG. 28, for example) returns information of the deletion device list 2029a as a response.

The deletion management unit 2029 repeats the following processes (S3310 to S3315) on all of the device IDs registered on the deletion device list 2029a. More specifically, the deletion management unit 2029 reads "deletion time and date" out of entries of the deletion device list 2029a on which the device IDs are registered (S3311), and calculates an elapsed time between the "deletion time and date" and the current time by using the read "deletion time and date" and the time and date of a built-in calendar timer (S3312).

Then, the deletion management unit 2029 compares the calculated elapsed time with the predetermined delay time (Td) (S3313), and in the case where the elapsed time is greater than the delay time (Td), more specifically, in the case where the delay time (Td) has passed since the reception apparatus has been deleted from the registration device list 2027a (Yes, in S3313), deletes the entry from the deletion device list 2029a (S3314). It is to be noted that the entry is held as it is in the case where the elapsed time is equal to or smaller than the delay time (Td), more specifically, in the case where the delay time (Td) has not passed since the reception to apparatus has been deleted from the registration device list 2027a (No, in S3313).

As described above, the deletion management unit 2029, when requested from the use-control-key transmission control unit 2030 for referring to the deletion device list 2029a, updates the deletion device list 2029a through the above-described procedure, and returns to the use control key transmit the use-control-key transmission control unit 2030 information on each entry registered on the updated deletion device list 2029a as a response to the reference request. This allows the reception apparatus deleted from the registration device list 2027a to remain registered on the deletion device list 2029a for a predetermined period (delay time), so that the reception apparatus can use the content for the predetermined period. Therefore, when a user who has the maximum number of reception apparatuses allowed by the number restriction deletes the entry of an existing reception apparatus and register a new reception apparatus for exchanging one of the reception apparatuses for the new reception apparatus, the deleted reception apparatus can use content for a predetermined period, so that any reception apparatuses can use content for the predetermined period, and thus it is possible to sufficiently carry out confirmation processing and the like for moving content. In other words, content use is not restricted even when exchanging reception apparatuses.

The transmission and reception system according to the present invention has been described based on the embodiments, however, the present invention is not limited to the embodiments. Other forms in which various modifications apparent to those skilled in the art are applied to the embodiments are included within the scope of the present invention, unless such changes and modifications depart from the scope of the present invention.

In the present embodiment, for example, although the transmission and reception system includes the transmission apparatus and the reception apparatus, the transmission and reception system may include a transmission and reception apparatus provided with the both functions of the transmission apparatus and the reception apparatus. Therefore, a transmission and reception apparatus in which the transmission apparatus and the reception apparatus according to the present invention are integrated is included in the present invention.

Further, although the reception apparatus 2010 determines whether or not to initiate the use control key obtainment processing by using the confirmation time period in the present embodiment, it is not limited to such period, but the period may be combined with other conditions (for example, a condition that a fee for the content is paid, and the like) for the initiation.

Further, although the AV sever 2001 holds the registration device list 2027a and the deletion device list 2029a separately in the present embodiment, both registration and deletion may be managed by a single list. For example, attributes (such as "registration" or "deletion") may be provided for each reception apparatus to perform management using a common list.

Further, although the transmission and reception system performs the use control key exchange process every time the authentication for obtaining use control key and the RTT measurement processing are carried out, the use control key may not be exchanged after the reception apparatus 2010 once obtained the use control key. More specifically, the reception apparatus 2010, after the obtainment, may update a confirmation period of the use control key that has already been held in the case where the authentication for obtaining use control key and the RTT measurement processing succeed. As described above, the processing of revalidating the use control key of which the available period is limited to a predetermined period may be handled as "new to issuance of use control information".

Further, although the transmission and reception system performs the authentication and the RTT measurement process separately for exchanging an exchange key and a use control key in the present embodiment, the present invention is not limited to such exchanging processing of the exchange key and the use control key. For example, the exchange key and the use control key may be exchanged collectively by performing a common authentication and RTT measurement process, and a key type to be requested may be switched using a parameter setting of requesting a start of authentication.

Further, a computer readable program recording medium on which a program and/or data is stored is also included in the present invention, the program and/or data allowing a computer to execute the function of the transmission and reception system of the present invention.

Further, each of the structural elements of the present invention may be implemented in a manner of software by using a program, a universal computer, and the like, or may be implemented in a manner of hardware by using a dedicated circuit and the like.

INDUSTRIAL APPLICABILITY

The present invention can be used in the case where copyrighted data is transferred between arbitrary devices connected to the network, and in particular, can be used for a network system in which external accumulation devices such as a network HDD and a device that can be taken out are connected.

Further, the present invention can be utilized as a transmission apparatus, a reception apparatus, and a transmission and reception system for transmitting content such as copyrighted video and audio data, for example, as an AV sever, a digital television, a portable player, a personal computer, and a content recording and reproducing apparatus, and particularly as a recording and reproducing apparatus that can support content transmission on a home network.

The invention claimed is:

1. A data transmission and reception system comprising:
a data transmission apparatus; and
a data reception apparatus,
wherein said data transmission apparatus includes:
a first communication unit configured to transmit copyrighted data and use control information;
a control information generation unit configured to generate use control information including use-control-information confirmation interval that indicates a measurement interval for measuring a round trip time taken for transmitting and receiving a packet;
a first proximity confirmation unit configured to control said first communication unit so that said first communication unit measures the round trip time to said data reception apparatus; and
a use information management unit configured to control said first communication unit so that said first communication unit transmits, to said data reception apparatus, a notification indicating that the use control information is valid in the case where the measured round trip time is equal to or less than a predetermined amount of time, and
said data reception apparatus includes:
a second communication unit configured to receive the copyrighted data and the use control information;
a second proximity confirmation unit configured to control said second communication unit so that said second communication unit responds to a request for measurement of the round trip time; and
a use information confirmation unit configured to control said second communication unit so that said second communication unit requests said data transmission apparatus to measure the round trip time, and in the case where the use-control-information confirmation interval has been exceeded without receiving, from said data transmission apparatus, the notification indicating that the use control information is valid, invalidates the received copyrighted data and discards the received use control information,
said data transmission apparatus transmits the copyrighted data to another data reception apparatus different from said data reception apparatus,
said data reception apparatus and the other data reception apparatus are apparatuses that are configured to use the copyrighted data,
said data reception apparatus receives the copyrighted data from the other apparatus, and the copyrighted data is transmitted from said data transmission apparatus and moved to said data reception apparatus via the other data reception apparatus.

2. The data transmission and reception system according to claim 1,
wherein said second communication unit is further configured to receive use-information-generation-apparatus information from the other data reception apparatus, the use-information-generation-apparatus information indicating an apparatus that has generated the use control information, and said use information confirmation unit is further configured to identify said data transmission apparatus as an apparatus that has generated the use-information-generation-apparatus information, with reference to the use-information-generation-apparatus information, and request said data transmission apparatus to measure the round trip time.

3. The data transmission and reception system according to claim 1,
wherein said data transmission apparatus further includes:
a use control information transmission unit configured to generate and transmit to said data reception apparatus, use control information that is information allowing use of the content in said data reception apparatus in the case where the round trip time is confirmed to be equal to or less than the predetermined amount of time by said first proximity confirmation unit;
a registration management unit configured to register, on a registration list, identification information of said data reception apparatus to which the use control information is transmitted by said use control information transmission unit, and to delete the identification information from the registration list in the case where an instruction to delete the identification information registered on the registration list is obtained; and
a deletion management unit configured to register, on a deletion list, the identification information deleted from the registration list, by said registration management unit,
wherein said use control information transmission unit is further configured to transmit new use control information in the case where a request for new use control information is received from an apparatus corresponding to identification information that is not registered on the registration list, on condition that said first proximity confirmation unit confirms that the round trip time between said data transmission apparatus and said apparatus corresponding to identification information that is not registered on the registration list is equal to or less than the predetermined amount of time when a total number of identification information entries on the registration list and the deletion list is less than a predetermined maximum number.

4. The data transmission and reception system according to claim 3,
wherein in said data transmission apparatus,
the registration list has a storage capacity of a predetermined number of identification information entries, and
said use control information transmission unit is configured to determine, when receiving a request for the use control information from an apparatus that is not registered on the registration list, whether or not the identification information entries on the registration list have reached the predetermined number and, when determining that the identification information entries on the registration list have not reached the predetermined number, to transmit the use control information to said apparatus from which the request has been received.

5. The data transmission and reception system according to claim 3,
wherein in said data transmission apparatus,
said deletion management unit is configured to delete the identification information with respect to which a predetermined delay time has passed after registration, from among identification information entries on the deletion list.

6. The data transmission and reception system according to claim 3,
wherein in said data transmission apparatus,
the registration list has a storage capacity of N identification information entries, and
the deletion list has a storage capacity of equal to or more than N identification information entries.

7. A data transmission and reception system, comprising:
said data a transmission apparatus according to claim 1;
said data reception apparatus according to claim 1; and
the other data reception apparatus according to claim 1.

* * * * *